United States Patent
Aggarwal et al.

(10) Patent No.: US 10,970,405 B2
(45) Date of Patent: Apr. 6, 2021

(54) METHOD AND ELECTRONIC DEVICE FOR MANAGING FUNCTIONALITY OF APPLICATIONS

(71) Applicant: SAMSUNG ELECTRONICS CO., LTD., Suwon-si (KR)

(72) Inventors: Rahul Aggarwal, Uttarakhand (IN); Vivek Kumar Dhiman, Haryana (IN); Lowlish Goel, Rajasthan (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 15/647,950

(22) Filed: Jul. 12, 2017

(65) Prior Publication Data

US 2018/0018470 A1    Jan. 18, 2018

(30) Foreign Application Priority Data

Jul. 12, 2016  (IN) .............................. 201641023876

(51) Int. Cl.
*G06F 21/60* (2013.01)
*G06F 21/62* (2013.01)
(Continued)

(52) U.S. Cl.
CPC .......... *G06F 21/604* (2013.01); *G06F 3/0486* (2013.01); *G06F 3/04817* (2013.01);
(Continued)

(58) Field of Classification Search
CPC ........ G06F 21/60; G06F 21/305; G06F 21/10; G06F 3/0481; G06F 3/0482; G06F 3/0486; G06F 8/34; G06F 8/20; G06F 8/70
(Continued)

(56) References Cited

U.S. PATENT DOCUMENTS 8,886,165 B2 * 11/2014 Kwon ..................... G06F 21/46
                                                             455/411
8,914,739 B2 * 12/2014 Khokhlov ............... G06F 9/451
                                                             715/764
(Continued)

FOREIGN PATENT DOCUMENTS

| EP | 2402856 A1 | 1/2012 |
| KR | 10-2012-0037581 A | 4/2012 |
| KR | 10-2015-0134949 A | 12/2015 |

OTHER PUBLICATIONS

Communication dated Nov. 3, 2017 by the International Searching Authority in International Patent Application No. PCT/KR2017/007469 (PCT/ISA/210, PCT/ISA/220 and PCT/237).

(Continued)

*Primary Examiner* — Saleh Najjar
*Assistant Examiner* — Khalid M Almaghayreh
(74) *Attorney, Agent, or Firm* — Sughrue Mion, PLLC

(57) ABSTRACT

There is provided an electronic device for managing functionality of applications. The device including a processor which detects an input with respect to a graphical element displayed on a display of the electronic device, the graphical element representing a first application, generates at least one sub-graphical element from the graphical element, the at least one sub-graphical element representing a functional data item associated with the first application and controls the display to display the at least one sub-graphical element.

21 Claims, 33 Drawing Sheets

(51) Int. Cl.
*H04M 1/725* (2021.01)
*G06F 3/0488* (2013.01)
*G06F 3/0481* (2013.01)
*G06F 3/0486* (2013.01)

(52) U.S. Cl.
CPC ........ *G06F 3/04883* (2013.01); *G06F 21/629* (2013.01); *G06F 21/6218* (2013.01); *H04M 1/72563* (2013.01); *G06F 2221/2149* (2013.01); *H04M 2250/22* (2013.01)

(58) Field of Classification Search
USPC ........ 715/841, 837, 741, 763, 769; 717/101, 717/120
See application file for complete search history.

(56) References Cited

U.S. PATENT DOCUMENTS

| | | | |
|---|---|---|---|
| 9,026,950 B2* | 5/2015 | Eltoft | G06F 3/04883 |
| | | | 715/863 |
| 9,836,206 B2* | 12/2017 | Park | G06F 3/04842 |
| 9,891,809 B2* | 2/2018 | Jung | G06F 3/04886 |
| 9,948,523 B2* | 4/2018 | Won | H04L 67/16 |
| 10,394,449 B2* | 8/2019 | Louch | G06F 3/0238 |
| 2002/0177449 A1 | 11/2002 | McDonnell et al. | |
| 2003/0098891 A1* | 5/2003 | Molander | G06F 3/0482 |
| | | | 715/841 |
| 2005/0266857 A1 | 12/2005 | Poikela | |
| 2006/0014547 A1 | 1/2006 | Walter | |
| 2009/0307631 A1* | 12/2009 | Kim | G06F 3/04883 |
| | | | 715/830 |
| 2011/0107272 A1* | 5/2011 | Aguilar | G06F 3/04883 |
| | | | 715/853 |
| 2011/0209098 A1 | 8/2011 | Hinckley et al. | |
| 2012/0151400 A1* | 6/2012 | Hong | G06F 3/0488 |
| | | | 715/769 |
| 2013/0346268 A1* | 12/2013 | Pereira | G06F 8/65 |
| | | | 705/34 |
| 2014/0013271 A1* | 1/2014 | Moore | G06F 3/04886 |
| | | | 715/792 |
| 2014/0082384 A1 | 3/2014 | De Cesare et al. | |
| 2015/0095882 A1* | 4/2015 | Jaeger | G06F 8/34 |
| | | | 717/109 |
| 2015/0248193 A1* | 9/2015 | Fujioka | G06Q 30/0641 |
| | | | 705/14.53 |
| 2015/0339055 A1* | 11/2015 | Cho | G06F 3/04842 |
| | | | 345/173 |
| 2015/0347982 A1* | 12/2015 | Jon | G06Q 10/1095 |
| | | | 705/7.19 |
| 2016/0062625 A1* | 3/2016 | Mao | G06K 9/00711 |
| | | | 715/841 |
| 2016/0259497 A1* | 9/2016 | Foss | G06F 3/0481 |
| 2017/0156179 A1* | 6/2017 | Viroli | F24C 7/086 |
| 2017/0308225 A1* | 10/2017 | Baek | G06F 3/04883 |
| 2019/0250813 A1* | 8/2019 | Block | G06F 1/163 |

OTHER PUBLICATIONS

Communication dated Jul. 26, 2019, issued by the European Patent Office in counterpart European Application No. 17827950.1.

* cited by examiner

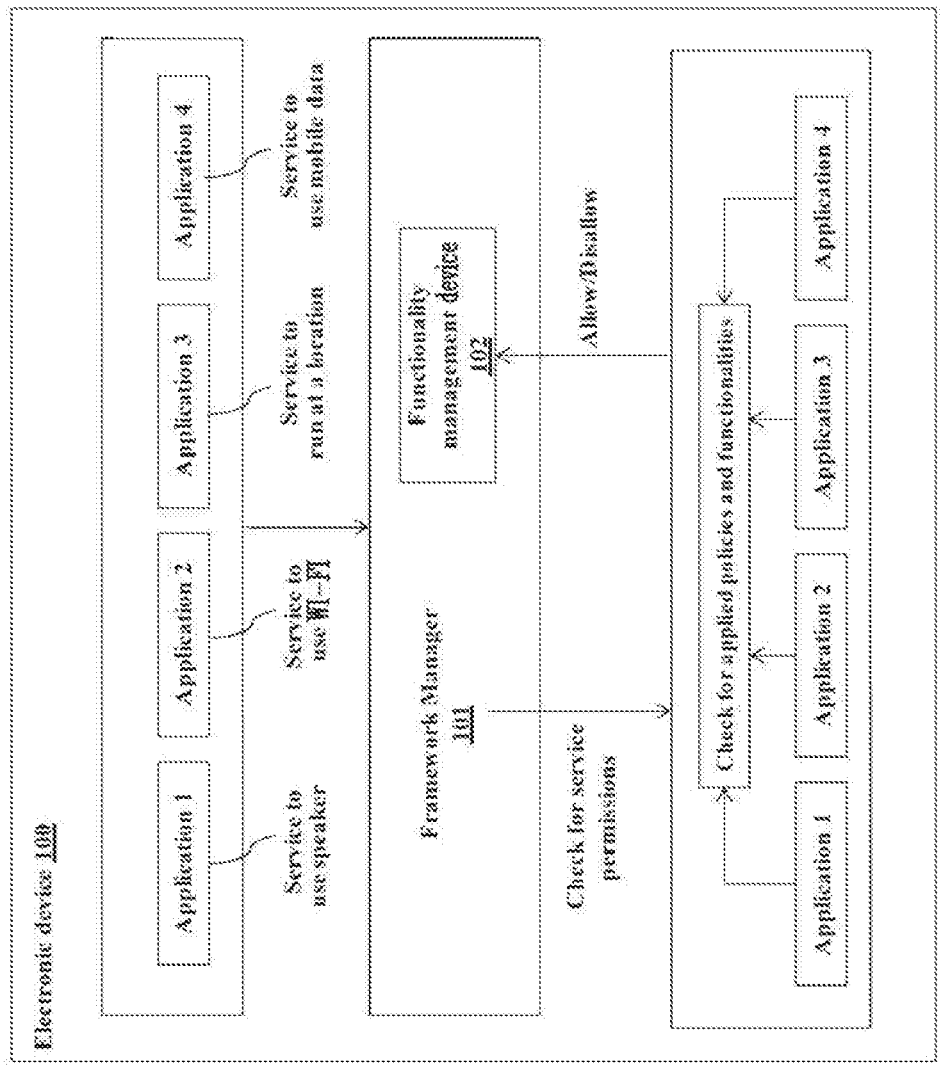

METHOD AND ELECTRONIC DEVICE FOR MANAGING FUNCTIONALITY OF APPLICATIONS

CROSS-REFERENCE TO RELATED APPLICATION

This application claims priority from Indian Patent Application No. 201641023876, filed on Jul. 12, 2016 in the Indian Patent Office, the disclosure of which is incorporated herein by reference in its entirety.

BACKGROUND

1. Field

Apparatuses and methods consistent with exemplary embodiments relate to an electronic apparatus, and more particularly to an electronic apparatus and a method capable of managing functionality of applications available of the electronic apparatus.

2. Description of Related Art

Related art an electronic device (e.g., a mobile device, a handheld device, a smartphone, and tablets) includes a plethora of applications each having one or more associated functionalities. These applications can be pre-installed in the electronic device by the manufacturer or installed by the user of the electronic device.

If the user of the electronic device enables a functionality associated with a pre-installed application, the electronic device applies the functionality globally to all applications installed or later installed on the electronic device. For example, if the user sets the electronic device to use mobile data functionality (e.g., Third Generation (3G) mobile data) instead of WI-FI functionality, all applications installed on the electronic device will transmit and receive data via 3G instead of WI-FI. In another example, if the user sets the electronic device to use a screen orientation application functionality (e.g., locking orientation to landscape mode) all applications will automatically launch in landscape mode (e.g., User Interface (UI) in landscape mode) regardless of the orientation of the electronic device. However, there exists no mechanism in which a user can individually apply an application functionality on an application-by-application basis, instead of having the application functionality applied globally to all applications installed on the electronic device. Moreover, existing mechanisms provide the user with limited control over functionalities, and existing systems are limited in this regard.

Further, in a related art electronic device, application developers generally create one or more default application specific policies for controlling electronic devices. For example, one policy of a camera application prevents the camera application from launching when battery percentage is 5% or less. The user cannot circumvent the policy and thus would be unable to use the camera application when the battery level is 5% or less.

SUMMARY

Exemplary embodiments address at least the above problems and/or disadvantages and other problems and disadvantages not described above. Also, the exemplary embodiments are not required to overcome the problems and disadvantages described above, and may not overcome any of the problems and disadvantages described above.

Exemplary embodiments may provide an electronic apparatus capable of managing functionality of applications available in an electronic device and a method thereof.

According to an exemplary embodiment, there is provide an electronic device for managing functionality of applications, the electronic device comprising: a memory; and a processor, coupled to the memory, configured to: detect an input with respect to a graphical element displayed on a display of the electronic device, the graphical element representing a first application; generate at least one sub-graphical element from the graphical element, the at least one sub-graphical element representing a functional data item associated with the first application; and control the display to display the at least one sub-graphical element.

The processor may be further configured to: determine a total number of functional data items associated with the first application; and dynamically generate at least two sub-graphical elements, wherein the at least two sub-graphical elements are equal or less in number compared to the total number of functional data items associated with the first application.

The processor may be further configured to: detect an association event input with respect to a second application and the functional data item associated with the first application; dynamically create at least one policy based on the association event; and apply the at least one policy to the second application.

The processor may be further configured to: apply the at least one policy to a third application other than the first application and the second application.

The at least one policy may comprise at least one of a dynamic policy, a derived policy, and a user created policy.

The processor may be further configured to display the at least one sub-graphical element in a functionality display region provided on at least a portion of the display of the electronic device.

The processor may be further configured to: detect when the at least one policy applied to the second application is met; identify at least one functionality which is associated with the first application and configured for the second application based on the at least one policy; and perform an action on the second application corresponding to the at least one functionality.

The action may further comprise at least one of: removing the at least one functionality, enabling the at least one functionality, and disabling the at least one functionality.

The functional data item may comprise at least one of: a functionality associated with the first application, a functionality associated with a dynamic policy, a functionality associated with a derived policy, a functionality associated with a user created policy, and a recommendation of combining at least two of the functionalities associated with the first application, the dynamic policy, the derived policy, and the user created policy.

The display may be configured to display the at least one sub-graphical element based on a priority associated with the functional data item.

According to another exemplary embodiment, there is provided an electronic device for managing a functionality of applications, the electronic device comprising: a memory; and a processor, coupled to the memory, configured to: detect an input entered with respect to a graphical element representing a first application displayed on a display of the electronic device; and control the display to display at least one sub-graphical element representing a functional data item associated with a second application in response to the detected input.

The processor may be further configured to: detect an association event input with respect to the first application and the functional data item associated with the second application; and perform an action on the first application based on the association event.

The action may comprise at least one of: dynamically creating and applying at least one policy to the first application based on the association event, enabling at least one functionality associated with the second application, and disabling the at least one functionality associated with the second application.

The processor may be further configured to: detect that at least one policy is met for the first application; identify at least one functionality which is associated with the second application and configured for the first application based on the at least one policy; and perform an action on the first application corresponding to the at least one functionality.

The action may comprise at least one of: inverting the at least one functionality, enabling the at least one functionality, and disabling the at least one functionality.

The functional data item may comprise at least one of: a functionality associated with the first application, a functionality associated with a dynamic policy, a functionality associated with a derived policy, a functionality associated with a user created policy, and a recommendation to combine at least two of the functionalities associated with the second application, the dynamic policy, the derived policy, and the user created policy.

The processor may be configured to display the at least one sub-graphical element on the display based on a priority associated with the functional data item.

According to another exemplary embodiment, there is provided a method of managing functionality of applications of an electronic device, the method comprising: detecting, by a processor, an input entered with respect to a graphical element displayed on a display of the electronic device, the graphical element representing a first application; generating, by the processor, at least one sub-graphical element from the graphical element, the at least one sub-graphical element representing a functional data item associated with the first application; and controlling, by the processor, the display to display the at least one sub-graphical element.

The method may further comprise: detecting, by the processor, an association event input with respect to a second application and the functional data item associated with the first application; dynamically creating, by the processor, at least one policy based on the association event; and applying, by the processor, the at least one policy to the second application.

The method may further comprise: applying, by the processor, the at least one policy to a third application other than the first application and the second application.

According to another exemplary embodiment, there is provided an apparatus comprising: a processor configured to: detect an input with respect to a feature of a first application; generate at least one sub-feature corresponding the feature of the first application, the sub-feature representing a functional data item associated with the first application; and perform an association operation to associate the at least one sub-feature to a second application.

The processor may be further configured to: dynamically create at least one policy based on the association operation associating the at least one sub-feature to the second application: and apply the at least one policy to the second application.

The processor may be further configured to display an icon on a display of the apparatus to indicate the at least one sub-feature.

The processor may be further configured to display the icon in vicinity of another icon representing the second application displayed on the display.

According to another exemplary embodiment, there is provided a method of managing functionality of applications of an electronic apparatus, the method comprising: detecting an input with respect to a feature of a first application; generating at least one sub-feature corresponding the feature of the first application, the sub-feature representing a functional data item associated with the first application; and performing an association operation to associate the at least one sub-feature to a second application.

The method may further comprise: dynamically creating at least one policy based on the association operation associating the at least one sub-feature to the second application; and applying the at least one policy to the second application.

The method may further comprise: displaying an icon on a display of the electronic apparatus to indicate the at least one sub-feature.

The method may further comprise: displaying the icon in vicinity of another icon representing the second application displayed on the display.

These and other aspects of the exemplary embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the exemplary embodiments herein without departing from the spirit thereof, and the exemplary embodiments herein include all such modifications.

BRIEF DESCRIPTION OF THE DRAWINGS

The above and other aspects of one or more exemplary embodiments will become more apparent by reference to exemplary embodiments thereof which are illustrated in the accompanying drawings. Understanding that these drawings depict only exemplary embodiments and are not therefore to be considered to be limiting of the scope of the disclosure, the principles herein are described and explained with additional specificity and detail through the use of the accompanying drawings, in which: Exemplary embodiments are illustrated in the accompanying drawings, throughout which same reference numerals or symbols indicate corresponding parts in the various drawings. The disclosure herein will be better understood from the following description with reference to the drawings, in which:

FIG. 1 illustrates a block diagram illustrating an electronic device including a framework manager and a functionality management device communicating therewith which manages one or more policies of one or more applications, according to an exemplary embodiment;

DETAILED DESCRIPTION

Figure 2A:
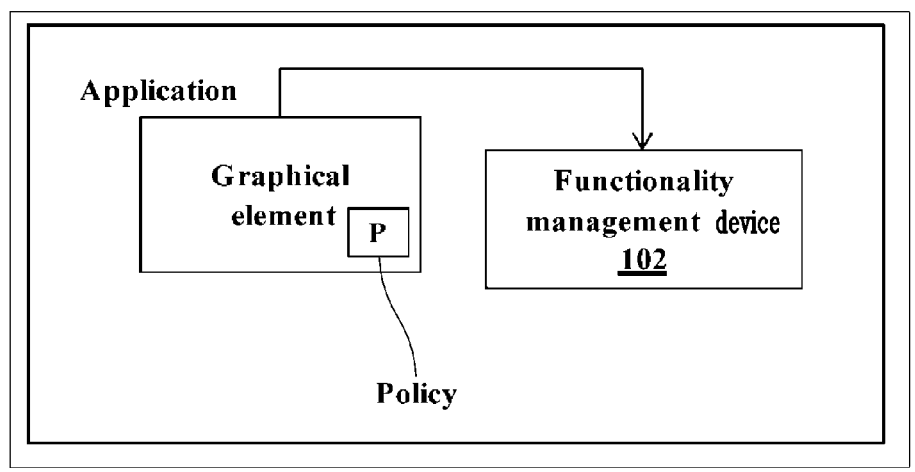
FIG. 2A illustrates an exemplary embodiment, in which, a functionality management device interacts with a framework manager to access one or more policies associated with (i.e., applied to) one or more applications.

Hereinafter, exemplary embodiments will be described in detail with reference to accompanying drawings. Elements illustrated in the accompanying drawings are referred to in the following descriptions of the exemplary embodiments and for clarity, like reference numerals or symbols presented in respective drawings denote like elements, which substantially perform the same functions.

In the following description, if terminologies, each of which includes such an ordinal number as 'first', 'second' and the like, are used, those terminologies are used (unless expressly specified otherwise) merely to describe various elements. The terminologies are only used for the purpose of differentiating one element from other elements. In doing so, the various elements should be non-limited by the corresponding terminologies, respectively. The terminologies used in the following description of various exemplary embodiments are applied for explanation purpose only and not for the purpose of limiting the exemplary embodiments as defined by the appended claims and their equivalents.

The disclosure herein and the various features and advantageous details thereof are explained more fully with reference to the non-limiting exemplary embodiments that are illustrated in the accompanying drawings and detailed in the following description. Descriptions of well-known components and processing techniques are omitted so as to not unnecessarily obscure the exemplary embodiments herein. Also, the various exemplary embodiments described herein are not necessarily mutually exclusive, as some exemplary embodiments can be combined with one or more other exemplary embodiments to form new exemplary embodiments. The term "or" as used herein, refers to a non-exclusive or, unless otherwise indicated. The examples used herein are intended merely to facilitate an understanding of ways in which the exemplary embodiments herein can be practiced and to further enable those skilled in the art to practice the exemplary embodiments herein. Accordingly, the examples should not be construed as limiting the scope of the exemplary embodiments herein.

Accordingly, the disclosure herein provides a method of managing functionality of applications available in an electronic device.

Unlike related art systems and methods, one or more of the exemplary embodiments of the disclosure provides a user with a capability to control or alter the policies associated with functional data items associated with one or more applications displayed on the electronic device.

Unlike related art systems and methods, one or more of the exemplary embodiments of the disclosure allows the user of the electronic device to leverage the functional data items associated with the first application (along with the functionalities associated with the functional data items) by providing the user the option to apply the functional data items (along with respective functionalities) to the one or more second applications.

For example, in the related art systems and methods, the user needs to invoke the settings of a particular application in order to view or change them. If the user needs to change the alert mode for a messaging application from a ringing mode to a silent mode, then the user must first launch the messaging application. The user then needs to navigate to an appropriate option to change and apply any desired settings.

Unlike the related art systems and methods, the method according to one or more exemplary embodiment can interchangeable apply functionalities of one application (e.g., first application) and at least one other application (e.g., second application). For example, in the related art mechanisms, a policy of a camera application is to disable camera operations when the battery level of the electronic device housing the camera is 5% or less. The electronic device may extract and apply this policy to any application, such as a messaging application (e.g., disable message notifications whenever the battery level is 5% or less). Thus, according to an exemplary embodiment, the user may create a newly applied policy, which the electronic device may maintain for future purposes and displayed on the display.

Referring now to FIGS. 1 through 22, where similar reference characters denote corresponding features consistently throughout the drawings, exemplary embodiments of the present disclosure are illustrated.

FIG. 1 illustrates a block diagram of an electronic device 100 including a framework manager 101 and a functionality management device 102, according to an exemplary embodiment as disclosed herein. In the exemplary embodiment, the electronic device 100 includes a number of applications (e.g., first, second, third, and fourth applications) as shown in FIG. 1 (Applications 1-4). In another exemplary embodiment, the electronic device 100 may include more than four applications or less than four applications. The functionality management device 102 may manage one or more policies of the applications.

The framework manager 101 may interact with the functionality management device 102 to monitor service permissions of Applications 1-4 based on one or more policies applied to each application (e.g., Applications 1-4). The service permissions may include, for example, service to use a speaker, service to use WI-FI, service to launch/run an application (e.g., Application 3) at a particular WI-FI location (i.e., when connected to a specific WI-FI network), and service to use mobile data only for a particular application (e.g., Application 4). The functionality management device 102 may communicate with a policy database to monitor/determine one or more policies associated (with (i.e., applied to) each of the applications. An example policy database is shown below in Table 1 as the policies may include, for example, muting alerts or notifications for the Application 1, connecting to home WI-FI when the Application 2 is in an OFF state, running/synching the Application 3 only when connected to a WI-FI location at work, and running the Application 4 only when connected to a mobile network (i.e., using mobile data). The policies illustrated herein are merely exemplary, and as such, numerous other policies may be provided.

Unlike related art methods and systems, the proposed functionality management device 102 according to one or more of the exemplary embodiment can interact with the framework manager 101 to monitor and allow/disallow the policies and functionalities associated with (i.e., applied to) each of the applications. The operations of functionality management device 102 are further detailed in conjunction with FIGS. 2A, 2B and FIG. 3.

TABLE 1

| Applications | State | Applied Policy |
|---|---|---|
| Application 1 | ON | Mute |
| Application 2 | OFF | Run home Wi-Fi |
| Application 2 | ON | |

FIG. 2A illustrated an exemplary embodiment, in which, the functionality management device 102 interacts with the framework manager 101 to access the policy/policies associated with (i.e., applied to) the one or more applications. According to an exemplary embodiment, the functionality management device 102 may interact with the framework manager 101 to allow/disallow policies applied to applications from a policy database (as shown in Table 2). For example, the functionality management device 102 may interact with the framework manager 101 to set the applied policies to 'ON' or 'OFF' states.

Figure 2B:
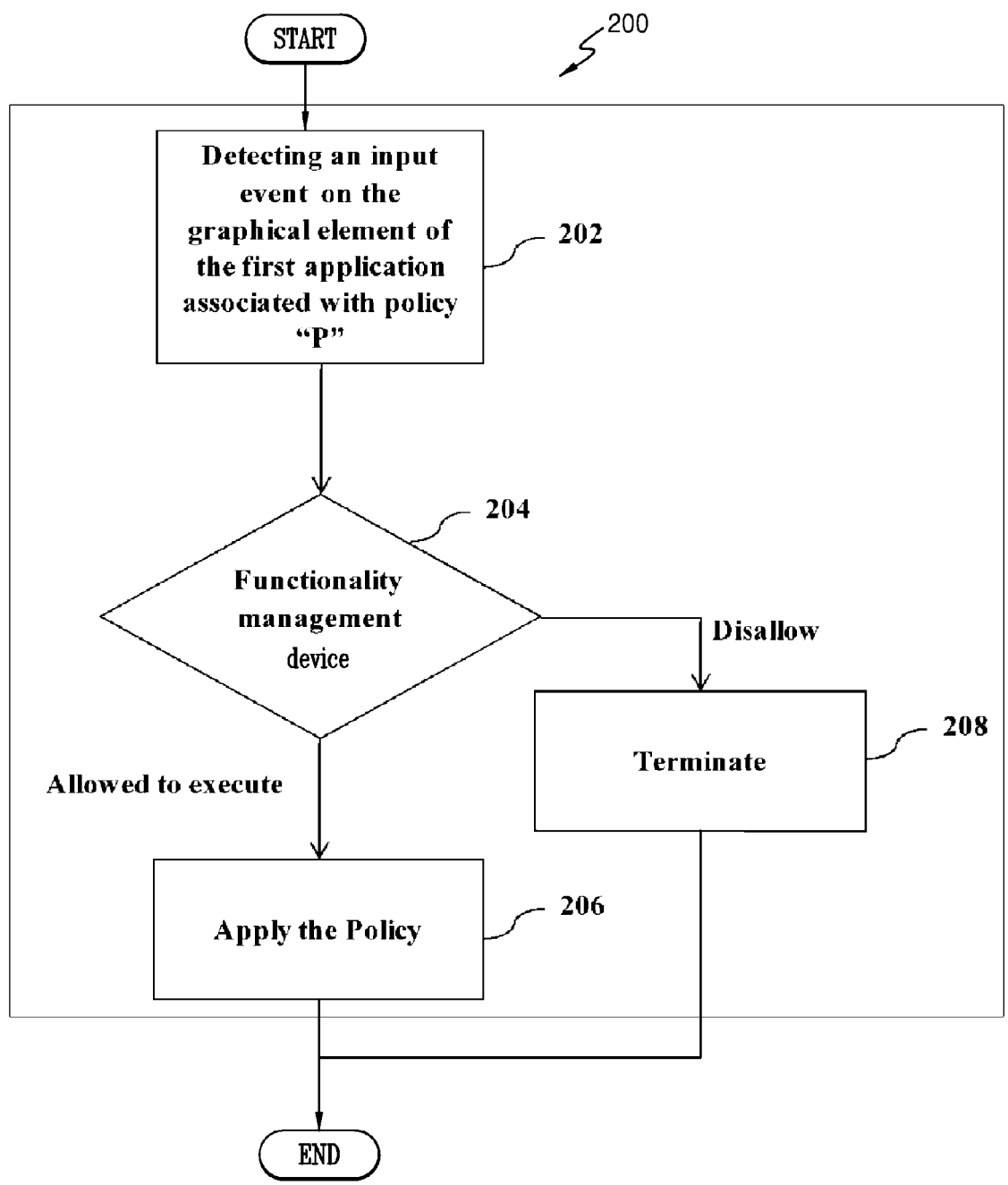
FIG. 2B is a flow diagram illustrating a method in which a functionality management device interacts with a framework manager to access a policy applied to an application, according to an exemplary embodiment.

A policy is created and applied to an application, as shown in FIG. 2B. Policies created and applied to applications are included in the policy database and monitored by the functionality management device 102.

TABLE 2

| Applications | State | Applied Policy |
|---|---|---|
| Application 1 | ON | Mute |
| Application 2 | OFF | Run home Wi-Fi |
| Application 2 | ON | |
| Application | ON | P |

FIG. 2B is a flow diagram 200 illustrating a method according to an exemplary embodiment, in which, the functionality management device 102 interacts with the framework manager 101 of the electronic device 100 to access a policy applied to an application, according to an exemplary embodiment as disclosed herein. At step 202, the method includes detecting an input event corresponding to the graphical element of the first application associated with a policy "P". According to an exemplary embodiment, the functionality management device 102 may detect the input event corresponding to the graphical element of the first application associated with the policy "P".

At step 204, the method includes determining, by the functionality management device 102, the state of the policy "P" from a database (Database 1) which includes the policy "P". For example, at step 204, the functionality management device 102 determines whether to allow or disallow the policy "P" (e.g., allow/disallow the policy "P" to execute or be applied). At step 206, the method includes applying the policy (e.g., Run) to the services associated with the first application based on the state determined by the functionality management device 102 in step 204 (e.g., the determination by the functionality management device 102 to allow the policy "P"). At step 208, the method includes terminating the services associated with the first application by discarding (i.e., disallowing) the policy "P" based on the state determined by the functionality management device 102 in step 204 (e.g., the determination by the functionality management device 102 to disallow the policy "P").

Unlike related art systems and methods, according to an exemplary embodiment, the user may create/derive a new policy ("P") and apply the same to one or more applications.

Figure 3:
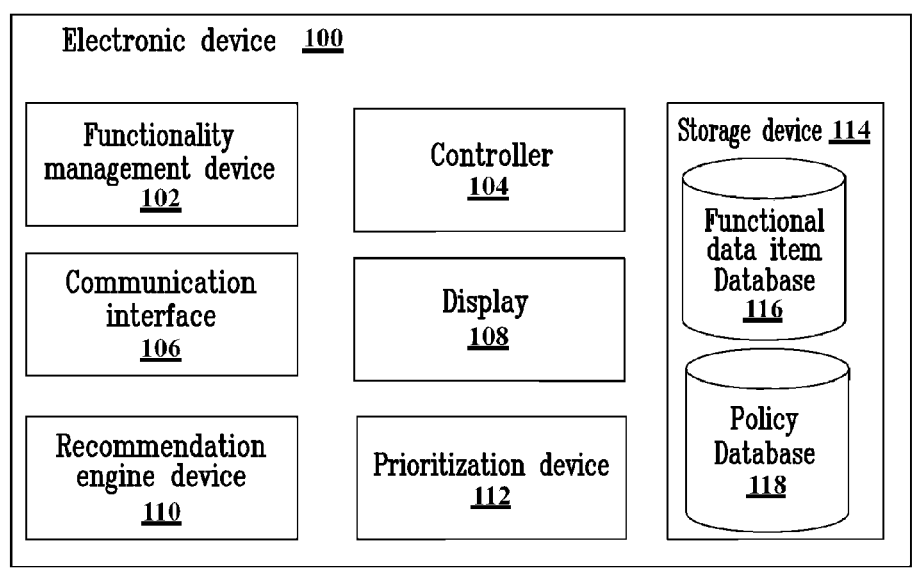
FIG. 3 illustrates various components of an electronic device for managing functionality of applications, according to an exemplary embodiment.

FIG. 3 illustrates various components of the electronic device 100, according to an exemplary embodiment as disclosed herein. According to the exemplary embodiment, the electronic device 100 can be, for example, a laptop, a desktop computer, a mobile phone, a smartphone, a Personal Digital Assistant (PDA), a tablet, a phablet, a consumer electronic device, a dual display device, or any other electronic device. In another exemplary embodiment, the electronic device 100 can be a wearable device. The wearable device can be, for example, a smartwatch, a smart bracelet, smart glasses, or the like. The electronic device 100 includes the functionality management device 102, a controller 104, a communication interface 106, a display 108 (e.g., a Cathode Ray Tube (CRT) display, a Liquid Crystal Display (LCD)), a recommendation engine device 110, a prioritization device 112, and a storage device 114. The storage device 114 can include a functional data item database 116 and a policy database 118. According to an exemplary embodiment, the one or more functionalities of the functional data item database 116 are detailed in conjunction with FIG. 4. According to an exemplary embodiment, the one or more functionalities of the policy database 118 are detailed in conjunction with FIG. 5. The functionality management device 102, controller 104, communication interface 106, display 108, recommendation engine device 110, and prioritization device 112 are implemented as one hardware processor but may also be implemented as a combination of more than one hardware processors.

Figure 4:
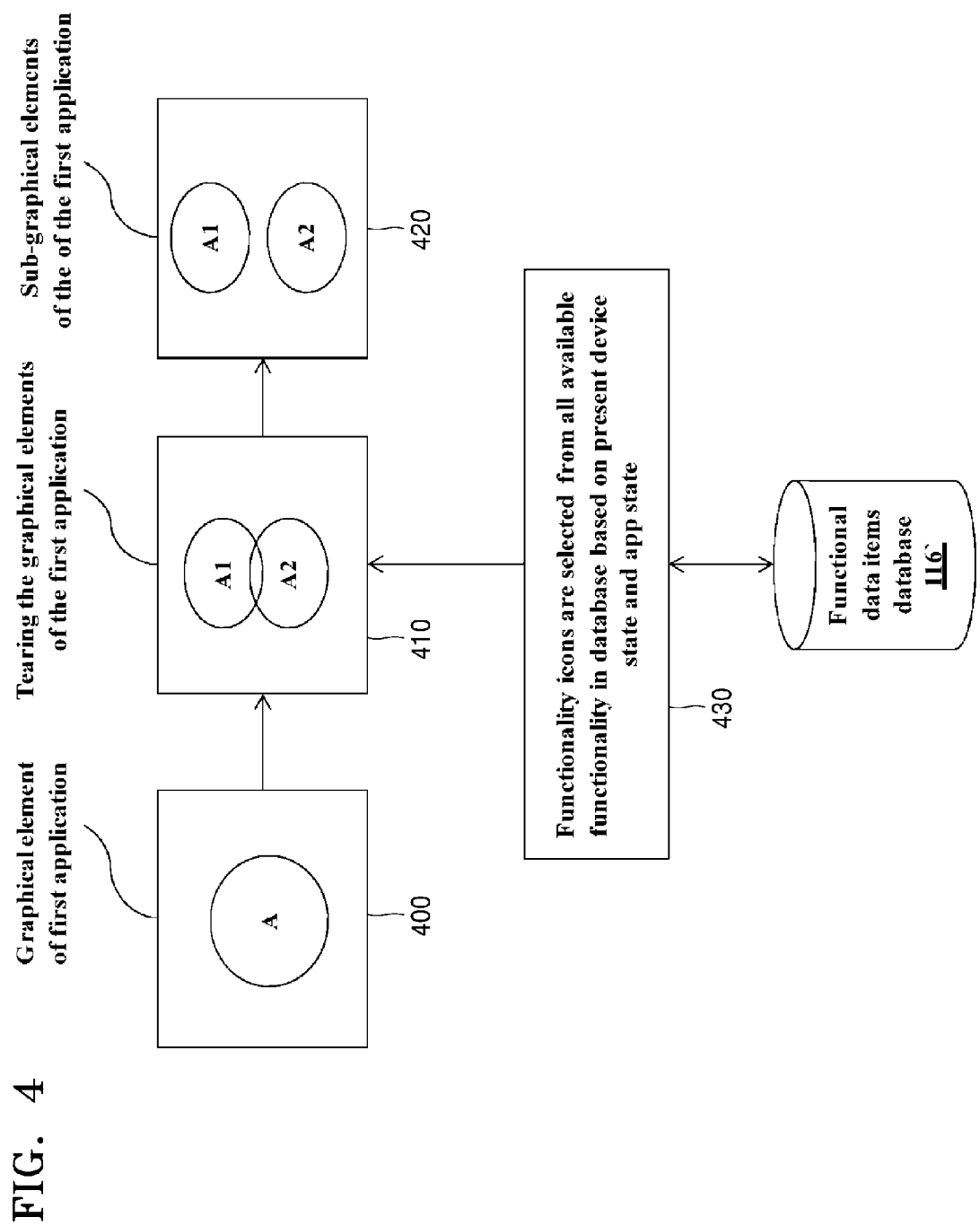
FIG. 4 illustrates an exemplary embodiment, in which, sub-graphical elements are generated from a graphical element, according to an exemplary embodiment.

The functionality management device 102 may detect an input entered with respect to a graphical element displayed on the display 108. The input may include, for example, motion gestures, long press gestures, pinch gestures, swipe gestures, touch gestures, or the like. The graphical element may be, for example, an icon (400) corresponding to an application installed on the electronic device 100 (e.g., first application, second application, etc.), a graphical data item corresponding to the application, a graphical symbol corresponding to the application, or the like. In an exemplary embodiment, the electronic device 100 may include (or, be associated with or connected to via a wireless or wired connection) the display 108 and a Light-emitting diode (LED) interfaced with the controller 104 and the functionality management device 102. The controller 104 may generate display data (e.g., the graphical element of an application) to be rendered on the display 108. Further, the functional management device 102 may generate at least two sub-graphical elements from the graphical element. For example, the functional management device 102 may split the graphical element of a first application (as shown in FIG. 4) into two sub-graphical elements A1 and A2 (410). According to an exemplary embodiment, the functional management device 102 may first check to determine whether the generation of at least two sub-graphical elements from the graphical element is possible (i.e., determine whether split functionality is available). In generating the sub-graphical elements (420), the functional management device 102 may identify functional data items associated with the first application (430) and dynamically generate sub-graphical elements which are equal in number to the identified functional data items. The functional management device 102 may control the display 108 to display the sub-graphical elements, along with a functional data item of the first application on each of the sub-graphical elements, as detailed in conjunction with FIG. 4. The functional data items respectively displayed on the sub-graphical elements differ from one another.

In an exemplary embodiment, the functional data item is at least one of: a functionality associated with the first application, a functionality associated with a dynamic policy, a functionality associated with a derived policy, a functionality associated with a user created policy, and a recommendation to combine at least two of the functionalities associated with the first application, the dynamic policy, the derived policy, and the user created policy.

Figure 12:
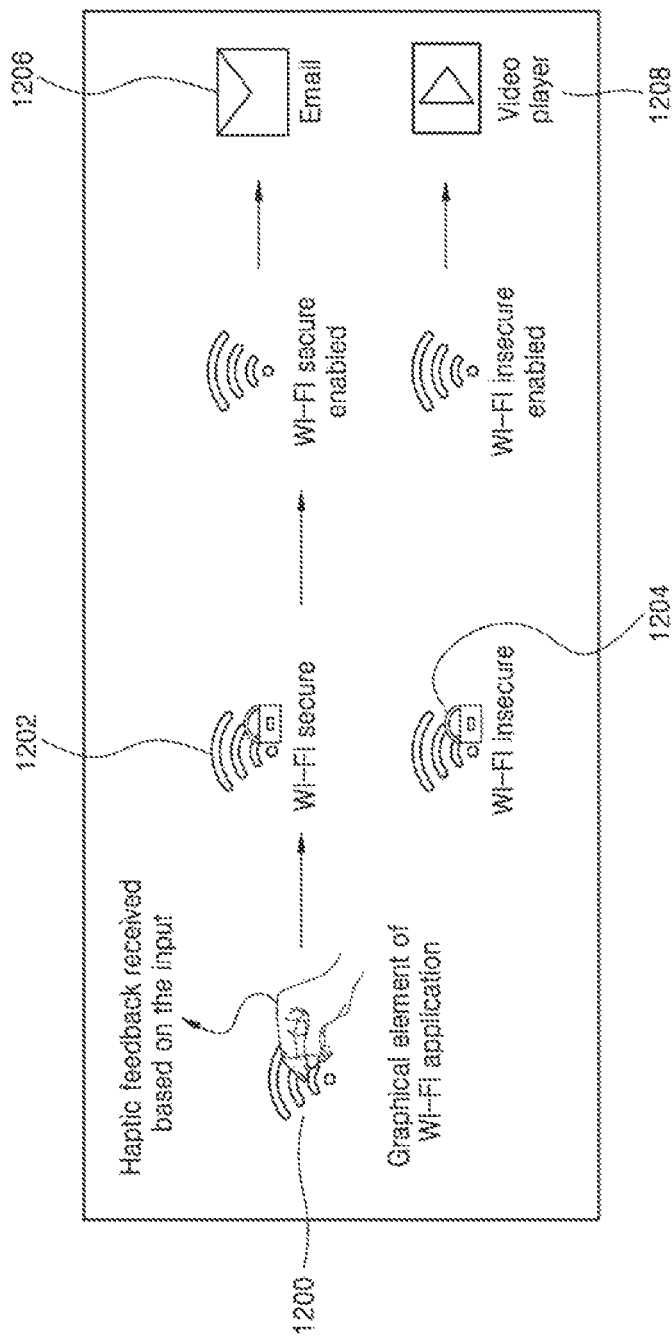
FIG. 12 illustrates an exemplary embodiment, in which, sub-graphical elements are generated from a graphical element.

Functionalities of the WI-FI application may include, for example, a WI-FI secure mode and a WI-FI unsecured mode, as shown according to an exemplary embodiment in FIG. 12.

Default functionalities may be established and registered into the system (i.e., system functionality) by an Original Equipment Manufacturer (OEM) development team, by the system itself (i.e., dynamic policy) based on system usage, or by the user (i.e., derived functionality). Further, characteristics of the system and dynamic policy will be further described below in detail in conjunction with FIG. 5.

The application monitoring device includes at least one submodule (e.g., WI-FI monitoring device, mobile data monitoring device, and location monitoring device, or the like) for monitoring activity of an application. The operations of the application monitoring device are detailed in conjunction with FIG. 7.

The functional management device 102 may detect an association event input with respect to a second application and a functional data item associated with the first application. The association event may include, for example, a drag input dragging (as detailed in FIG. 13C) a sub-graphical element of the first application onto a graphical element representing the second application. Further, the sub-graphical elements are displayed on the display 108. The placement and locations may be user defined/as per User Interface (UI) protocol of the electronic device 100.

Once the functionality associated with the sub-graphical element is applied to the second application (e.g., the sub-graphical element is dragged onto graphical element representing the second application), the functionality management device 102 may dynamically create one or more policies based on the association event. The functional management device 102 may apply one or more of the policies to the at least one second application. The functional management device 102 may detect when a policy applied to the second application (e.g., the policy applied to the second application based on the association event) has been met or satisfied.

The functionality management device 102 may identify a functionality which is associated with the first application and configured for the second application based on the at least one policy. Furthermore, the controller 104, communicatively coupled to the functionality management device 102, may perform an action corresponding to the identified functionality on the first application.

In an exemplary embodiment, the action may include at least one of inverting (i.e., reversing, as detailed in FIGS. 17A and 17B) the functionality which is associated with the first application and configured for the second application, enabling the functionality, and disabling the functionality.

In an exemplary embodiment, the communication interface 106 may communicate with external devices via one or more networks, and the components of the communication interface 106 may communicate internally. The storage device 114 may include one or more computer-readable storage media. The storage device 114 may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the storage device 114 may, in some examples, be a non-transitory storage medium. The term "non-transitory" indicates that the storage medium is not embodied in a carrier wave or a propagated signal. However, the term "non-transitory" should not be interpreted to mean that the storage device 114 is non-movable. In some examples, the storage device 114 may store larger amounts of information than a memory. In certain examples, a non-transitory storage medium may store data that can, over time, change (e.g., in Random Access Memory (RAM) or cache).

The recommendation engine device 110 may perform one or more of the following:
 a) Detect a multi-touch input with respect to a graphical element representing the first application.
 b) Check whether split functionality is available
 c) If split functionality is available, provide device feedback (e.g., haptic feedback, visual feedback, audible feedback, or a combination thereof) to user
 d) Recommend and display the functionality having the highest priority.
 e) Detect an additional input entered by the user and provide additional functionalities having the next highest priority (as shown in Table 3).

TABLE 3

Recommendation engine device 110 and prioritization device 112 database

| Graphical element | Functionality Available | Functionality Type | Module to enable/disable functionality | Action to be performed | Priority |
|---|---|---|---|---|---|
| Wi-Fi | Wi-Fi ON | System | Wi-Fi module | ON/allow Wi-Fi | 1 |
| Wi-Fi | Wi-Fi OFF | System | Wi-Fi module | OFF/disallow Wi-Fi | 1 |
| Wi-Fi | Wi-Fi Home App | Dynamic | Wi-Fi module | Only allow for this application | 2 |
| Wi-Fi | Wi-Fi Office App | Dynamic | Wi-Fi module | Only allow for this application | 2 |

Figure 8:
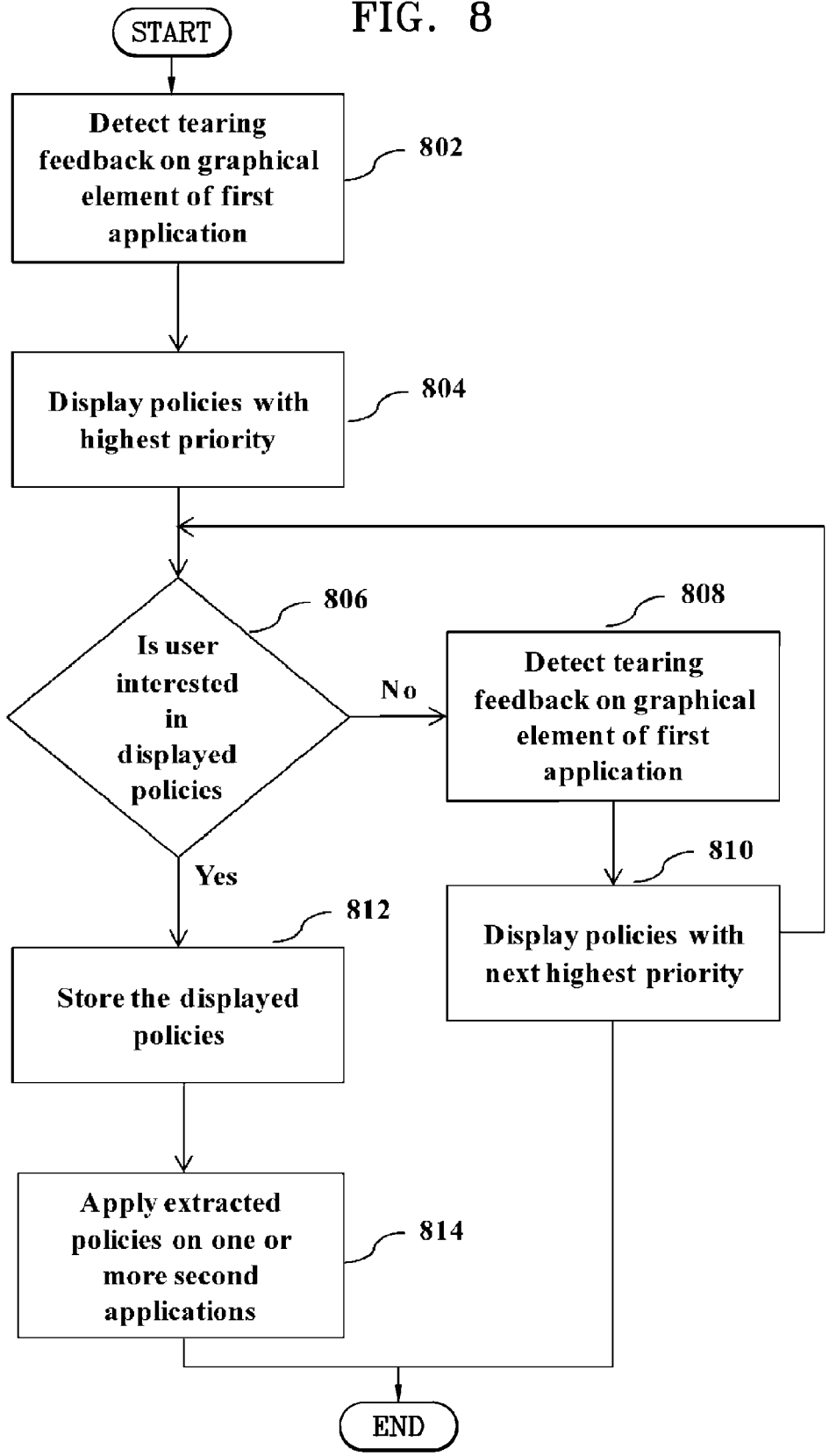
FIG. 8 is a flow diagram illustrating a method of displaying one or more policies based on a recommendation engine device and a prioritization device, according to an exemplary embodiment.

In an exemplary embodiment, the prioritization device 112 may display sub-graphical elements based on priorities associated with the functional data items, as detailed in conjunction with FIG. 8. The prioritization device 112 may calculate the priorities of the functional data items based on parameters such as number of times a policy is used, location, state of the electronic device 100, and the like (as shown in the Table 3).

The prioritization device 112 may prioritize the functional data items based on parameters such as number of times a functionality is used, location, state of the electronic device 100, or the like.

TABLE 4

| Graphical element | Functionality Available | Priority (Usage history) |
|---|---|---|
| Wi-Fi | Wi-Fi ON | 1 (10) |
| Wi-Fi | Wi-Fi OFF | 1(7) |
| Wi-Fi | Wi-Fi Home App | 2(4) |
| Wi-Fi | Wi-Fi Office App | 3(2) |

TABLE 5

| Graphical element | Functionality Available | Priority (Usage history) |
|---|---|---|
| Wi-Fi | Wi-Fi ON | 1(10) |
| Wi-Fi | Wi-Fi OFF | 1(7) |

TABLE 5-continued

| Graphical element | Functionality Available | Priority (Usage history) |
|---|---|---|
| Wi-Fi | Wi-Fi Home App | 3(6) |
| Wi-Fi | Wi-Fi Office App | 2(6) |

According to an exemplary embodiment, the priorities as shown in Table 4 above may be updated based on functionality usage history, and the updated priorities are shown in Table 5. For example, the priority of the WI-FI Home App changes from '2' to '3', thus becoming lower in priority than the WI-FI Office App) as shown in the Table 5.

Exemplary embodiments of the electronic device 100 are not limited to the components illustrated in FIG. 3. In other exemplary embodiments, the electronic device 100 may include more or less components compared to that shown in FIG. 3. Further, the labels or names of the units are used only for illustrative purpose and does not limit the scope of the disclosure. One or more components can be combined together to perform functions identical or substantially similar to those of the electronic device 100.

As discussed above, FIG. 4 is an illustration in which sub-graphical elements are generated from a graphical element, according to an exemplary embodiment. In an exemplary embodiment, the graphical element displayed on to the display 108 may represent a first application such as, for example, a network application (e.g., WI-FI), a mobile data application, a system volume control application (e.g., volume control application for the electronic device 100), display 108 orientation (e.g., landscape and portrait) application, or the like. In an exemplary embodiment, the first application may be associated with one or more functional data items, and the electronic device 100 displays one or more sub-graphical elements generated (i.e., split) from the graphical element of the first application. In an exemplary embodiment, each of the sub-graphical elements represents one of the functional data items associated with the first application, as detailed in the conjunction with FIG. 12. The functional data items are selected from the functional data item database 116 based on the present state of the electronic device 100 and the present state of the first application.

The functional data item database 116 may include at least one of a functionality associated with the first application, a functionality associated with the dynamic policy, a functionality associated with the derived policy, a functionality associated with the user created policy, and the recommendation to combine at least two of the functionalities associated with the first application, the dynamic policy, the derived policy, and the user created policy. The functionalities associated with the derived policy are detailed in conjunction with FIG. 6. The functionalities associated with the user created policy are detailed in conjunction with FIG. 5. The functionalities associated with the dynamic policy are detailed in conjunction with FIG. 7.

According to an exemplary embodiment, the user may enter a multi-touch input with respect to a graphical element representing an application. For example, the user may input a tap and hold gesture (e.g., long press) or a pinch open gesture with two fingers on a graphical element representing a first application. In another exemplary embodiment, the user may input the multi-touch input through one of various other methods. The electronic device 100 may output device feedback (e.g., haptic feedback, audible feedback, visual feedback, etc.) to the user indicating the availability of any functionalities which are associated with the first application and may be applied to other applications. The functional management device 102 can determine the present condition of the first application and display sub-graphical elements to the user. The electronic device 100 may utilize, for example, identifiers to differentiate the sub-graphical elements with respect to functionality of the first application, as illustrated in one or more exemplary embodiments described below. The user may apply a desired functionality of the first application to another application (e.g., a second application) installed on the electronic device 100, for example, by dragging a sub-graphical element corresponding to the desired functionality onto the graphical element of the other application (e.g. the second application). Further, the user is not limited to selecting from only the displayed sub-graphical elements (e.g., selecting from the functionalities presented by the electronic device 100). The user can dynamically create and/or modify functionalities (i.e., create user policies) via the electronic device 100.

According to an exemplary embodiment, the user may undo or modify an applied functionality by inputting a gesture with respect to a sub-graphical element representing the applied functionality. In an example, a sub-graphical element representing a functionality of the first application is displayed by the electronic device 100 over a graphical element representing the second application. When the user enters an input with respect to the sub-graphical element (e.g., a single tap, double tap, tap and hold, etc.), the electronic device 100 may present the user with options to, for example, undo or modify the functionality applied to the second application. In another example, the electronic device 100 may present the user with options to move or additionally apply the functionality applied to the second application to another application (e.g., present the user with options to copy and/or drag the sub-graphical element to a graphical element representing a third application). Further detail will be provided in FIGS. 17A and 17B.

According to another exemplary embodiment, the user may create a functionality (i.e., create a user policy) from a combination of functionalities of multiple applications. In an example, in response to inputs entered by the user with respect to graphical elements representing the first application and the second application, the electronic device 100 may generate sub-graphical elements for each of the applications. The user may enter an input combining sub-graphical elements from the two application, thereby creating a new functionality from the functionalities of the two applications. Such user created policies may be stored in and later accessed from the storage device 114.

Figure 5:
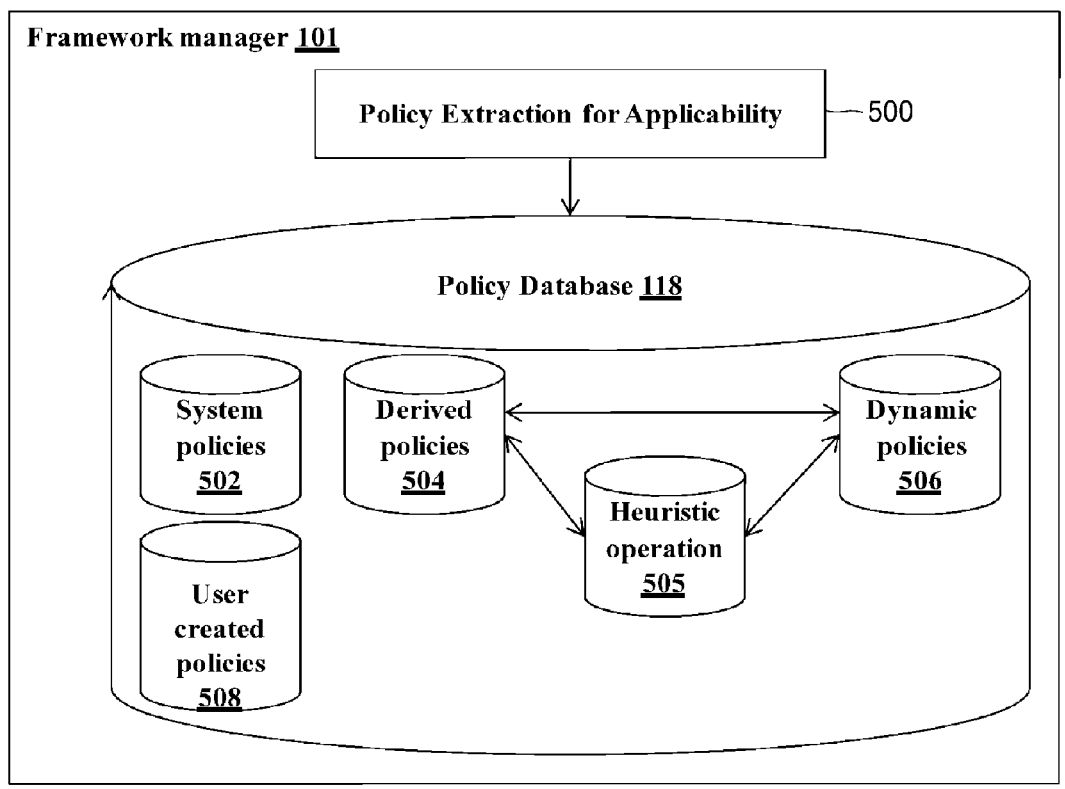
FIG. 5 illustrates a framework manager capable of extracting one or more policies from a policy database, according to an exemplary embodiment.

FIG. 5 illustrates the framework manager 101 capable of extracting the one or more policies (500) from the policy database 118, according to an exemplary embodiment as disclosed herein. In an exemplary embodiment, the policy database 118 may include system policies 502, derived policies 504, dynamic policies 506, and user created policies 508. The functionality management device 102 may analyze the derived policies 504 and dynamic policies 508 and store the results in heuristics data 505. The heuristics data 505 may include data on the derived policies 504 and dynamic policies 508 with respect to the user input, usage frequency, or the like. The electronic device 100 may utilize the heuristics data in providing priorities of functional data items to the user as described above with respect to Table 4 and Table 5.

The system policies 502 may include policies defined by the system or vendor during manufacture of the device (as shown in Table 6), such as, Mute/Unmute Notifications, Volume ON/OFF, Blocking Mode or the like. The system tearing functionality registration can include developer registering the tearing policy while the first application is in development in the policy database 118. The OEM may provide and store graphical elements (e.g., graphical elements specific to policies of the OEM) in a specific location of the electronic device 100. The OEM may update the policy database 118 with system specific policies related to applications (e.g., functions which the OEM sets as unchangeable by the user).

TABLE 6

| Graphical elements | Functionality Available | Functionality Type | Mode to Enable/disable functionality | Actions to be performed | Policy characteristics |
|---|---|---|---|---|---|
| Camera | Capture images | System | Camera module | Launch/Allow camera | NA |
| Camera | Record videos | System | Camera module | Launch/Allow video record | NA |
| Camera | Flash | System | Flash module | Allow Flash | NA |
| Camera | No camera | System | Camera module | Disallow camera | NA |

The derived policies 504 may include policies based on functionalities often used by the user, policies derived by the functionality management device 102, and policies derived by the user. For example, the functionality management device 102 may analyze functionalities often used by the user and merge them into a single policy or group the functionalities into policies based on usage frequency. In another example, the user may merge two or more functionalities into a policy. The user may change, or modify, or delete any of the derived policies, as detailed in conjunction with FIG. 6.

The dynamic policies 506 may include policies based on usage of electronic device 100 by the user, state of the electronic device 100, state of an application, network states, and policies applied to any of the applications. For example, the functionality management device 102 may analyze activity of each application and, based on the frequency of each activity and the frequency between similar activities, create a dynamic policy and store the same to the dynamic policy database 506. The functionality management device 102 may automatically apply the dynamic policy to any of the applications based on user settings or preferences. The operations of the application monitoring device are detailed in conjunction with FIG. 7.

Figure 6:
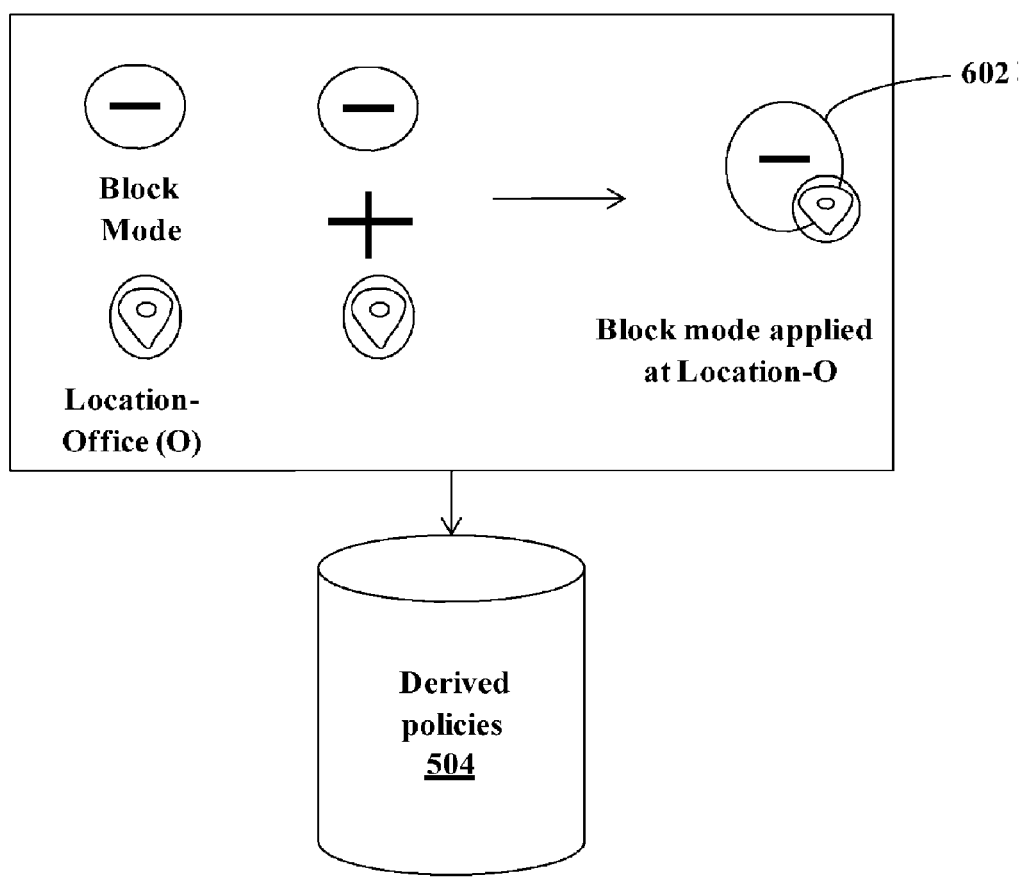
FIG. 6 illustrates an exemplary embodiment, in which, derived policies are created and maintained in a derived policies database.

FIG. 6 illustrates an exemplary embodiment, in which, the derived policies are created and stored to the derived policies database or/maintained in the derived policies database 504. According to an exemplary embodiment, the functionality management device 102 may generate a sub-graphical element representing a Blocking Mode of a notification application, the Blocking Mode disables, for example, incoming calls (except for specified contacts), social media, notifications, alarms, a Light Emitting Diode (LED) indicator, etc. Further, the functionality management device 102 generates a sub-graphical element representing a Location-Office (Location-O) associated with a location application. According to the exemplary embodiment, the functionality management device 102 create a new policy derived from functionalities of the notification application and the location application (e.g. a policy derived from both the Blocking Mode and the Location-O). For example, the electronic device may apply the derived policy to an Email application such that all Email notifications are blocked when the electronic device 100 is at the Location-O.

The electronic device 100 may automatically enable the Blocking Mode when at the Location-O, disabling notifications, social media, alarms, the LED indicator, and the like. In an exemplary embodiment, the derived policy (Blocking Mode+Location-O), represented by graphical element 602, can also be manually enabled or disabled by the user of the electronic device 100. Derived policies are maintained in and accessible via the derived database 504. In an exemplary embodiment, the design and the custom functionality associated with the graphical element 602 may be independent of the applications from which the custom functionality is based. For example, the design of the graphical element 602 may be illustrated different from that shown in FIG. 6 and is not limited to including design elements related to Blocking Mode and Location-O. Further, the custom functionality associated with the graphical element may be maintained even if applications from which the custom functionality is based (e.g., Blocking Mode and Location-O) are reset or uninstalled from the electronic device 100.

The derived functionalities are created when the user utilizes the one or more functionalities and combine (merge) them to make the new functionality i.e. called derived functionality.

Figure 7:
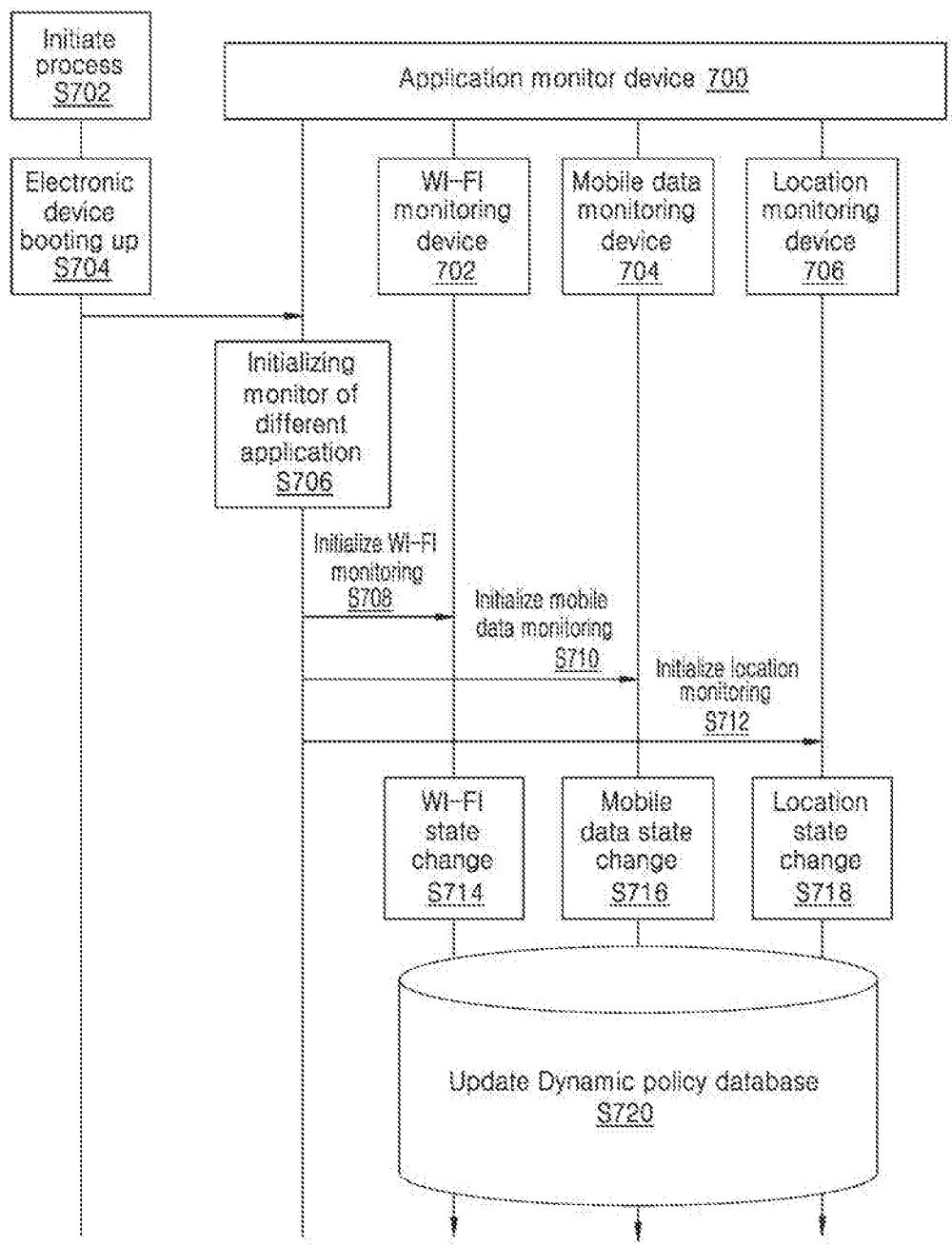
FIG. 7 illustrates an application monitoring device, which monitors an activity of an application, according to an exemplary embodiment.

FIG. 7 illustrates an exemplary embodiment, in which, an application monitoring device 700 monitors the activity of an application. The application monitoring device 700 includes application modules such as, for example, a WI-FI monitoring device 702, a mobile data monitoring device 704, and a location monitoring device 706. The aforementioned monitoring devices are implemented as one hardware processor but may also be implemented as a combination of hardware processors. Upon initiating the activity monitoring process (S702), the electronic device 100 boots up (S704) and may initialize application monitoring services (S706) for one or more applications. In the example illustrated in FIG. 7, the electronic device 100 initializes a WI-FI monitoring service (S708), initializes a mobile data monitoring service (S710), and initializes a location monitoring service (S712).

Each application module can monitor for and record changes which occur during the application monitoring process S702 (e.g., a WI-FI state change S714, a mobile data state change S716, a location state change S718). For example, the WI-FI monitoring device 702 can monitor ON/OFF states of WI-FI connections, monitor which applications installed on the electronic device 100 are connected to or are configured to connect to a WI-FI network, create a policy with Access Point (AP) information such as Name, Mac address and frequency, and monitor and record the number of times the electronic device 100 (e.g., an application installed on the electronic device) accesses a saved or known WI-FI network). The mobile data module 704 can monitor ON/OFF states of mobile data connections, monitor which applications installed on the electronic device 100 are connected to or are configured to connect to a 2G, 3G, or 4G networks, create network connection policies based on network data speeds, and monitor and record the number of times the electronic device 100 (e.g., an application installed on the electronic device) accesses a saved or known mobile network). The location monitoring device 706 can monitor the Global Positioning System (GPS) location of the electronic device 100 and create policies according to locations frequently visited by a user (e.g., office, workplace, or the like).

The policies created by each application module may be maintained and updated (S720) in the dynamic policy database 506 by the application monitoring device 700 as shown in Table 7.

TABLE 7

| Graphical elements | Functionality Available | Functionality Type | Mode to Enable/disable functionality | Actions to be performed | Policy characteristics |
|---|---|---|---|---|---|
| Wi-Fi | Wi-Fi-ON | System | Wi-Fi module | ON or allow Wi-Fi | NA |
| Wi-Fi | Wi-Fi-OFF | System | Wi-Fi module | OFF or disallow Wi-Fi | NA |
| Wi-Fi | Wi-Fi Home | Dynamic | Wi-Fi module | Only allows this application | Mac address |
| Wi-Fi | Wi-Fi Office | Dynamic | Wi-Fi module | Only allows this application | Mac address |

FIG. 8 is a flow diagram 800 illustrating a method in which the one or more policies are displayed based on the recommendation engine device 110 and the prioritization device 112, according to an exemplary embodiment as disclosed herein. At step 802, the method includes detecting device feedback in response to an input entered with respect to a graphical element representing an application (e.g., a first application). In an exemplary embodiment, the functionality management device 102, communicatively coupled to the prioritization device 112, may detect for device feedback.

In an exemplary embodiment, the device feedback may include, for example, haptic feedback (e.g., vibration), visual feedback, audible feedback, or a combination thereof generated and output by the electronic device 100.

At step 804, the method includes displaying the policies according to priority (e.g., displaying policies having the highest priority). In an exemplary embodiment, the display 108, communicatively coupled to the prioritization device 112, may display the policies according to priority (e.g. policies having the highest priority), as shown in the Table 4. According to an exemplary embodiment, the policies are displayed in response to the detection of the device feedback. According to another exemplary embodiment, the policies are displayed in response to the input entered with respect to the graphical element representing an application.

At step 806, the method includes determining whether the user is interested in the displayed policies. In an exemplary embodiment, the functionality management device 102 may determine whether the user is interested in the displayed policies. The determination may include, for example, analyzing user activity with respect to similar policies, or requesting and analyzing for a user input with respect to the displayed policies, but is not limited thereto. For example, the user activity includes the user selecting one of the displayed policies.

If at step 806, the functionality management device 102 determines that the user is not interested in the displayed policies, the method proceeds to step 808, which includes detecting for additional device feedback with respect to the graphical element representing the first application. For example, if the user is not interested in any of the policies displayed in step 804, the user may enter an additional input (e.g., a multi-touch input) with respect to the graphical element to inquire or request whether additional policies are available with respect to the first application. To notify the user that additional policies are available, the electronic device 100 may output device feedback (examples of which are described above), and upon detection of the device feedback, the method may proceed to step 810. In an exemplary embodiment, the functionality management device 102, communicatively coupled to the prioritization device 112, may detect for the additional device feedback.

At step 810, the method includes displaying the policies having the next highest priorities. In an exemplary embodiment, the display 108 may display the policies having the next highest priority. According to an exemplary embodiment, the method terminates if there are no more policies to be displayed.

If at the step 806, the functionality management device 102 determines that the user is interested in the displayed policies, then the method proceeds to step 812, which includes storing the displayed policies. In an exemplary embodiment, the functionality management device 102 may store the displayed policies in the storage device 114.

At step 814, the method includes applying the stored policies to one or more additional applications installed on the electronic device 100 (e.g., a second application). In an exemplary embodiment, the controller 104 may apply the extracted policies to the additional applications.

The various actions, acts, blocks, steps, or the like in the method of the flow diagram 800 may be performed in the order presented, in a different order or simultaneously. Further, in some exemplary embodiments, some of the actions, acts, blocks, steps, or the like may be omitted, added, modified, skipped, or the like without departing from the scope of the disclosure.

Figure 9:
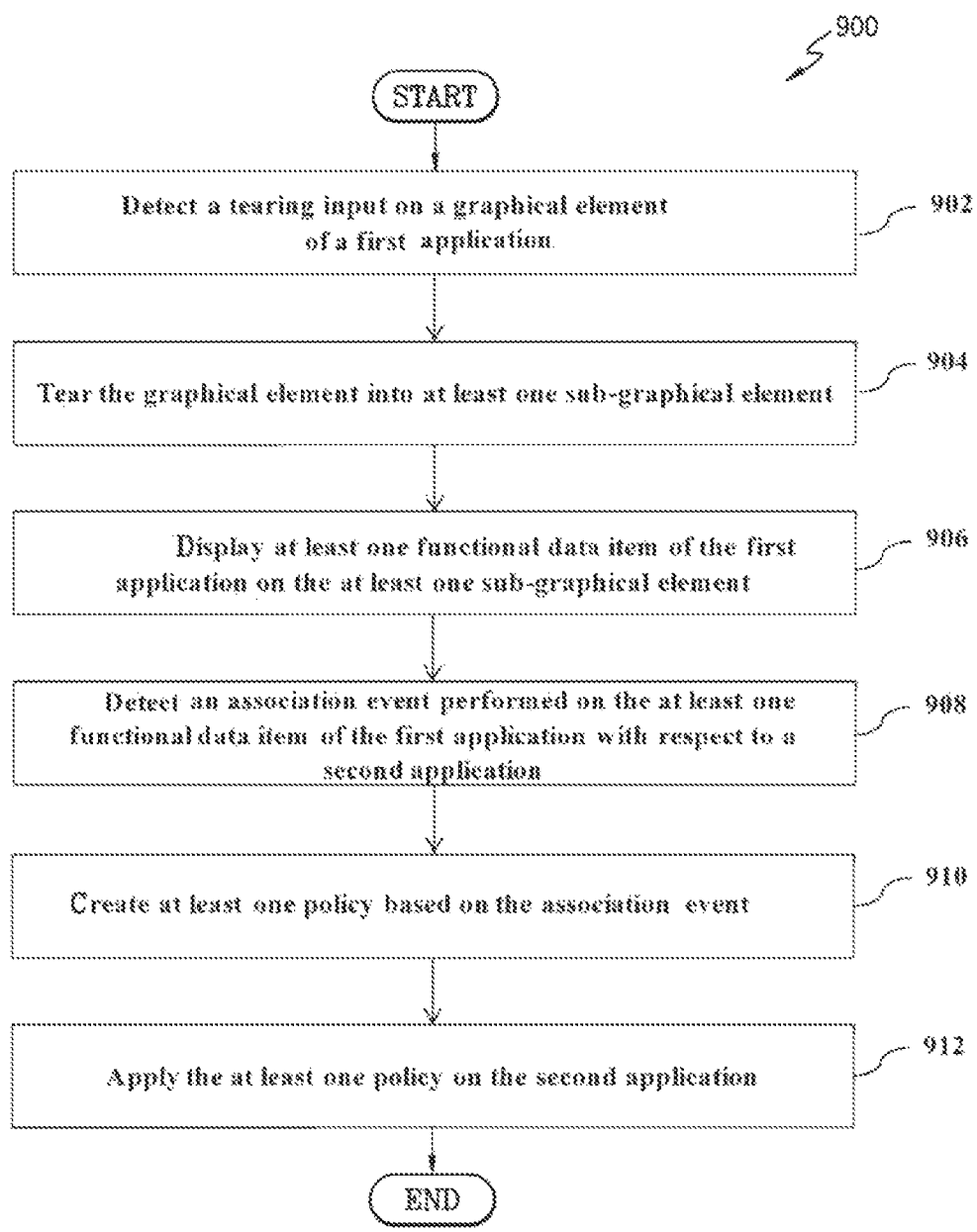
FIG. 9 is a flow diagram illustrating a method of managing functionality of applications, according to an exemplary embodiment.

FIG. 9 is a flow diagram 900 illustrating a method of managing functionality of applications of the electronic device 100, according to an exemplary embodiment as disclosed herein. At step 902, the method includes detecting an input entered with respect to a graphical element displayed on a display 108 of the electronic device. The graphical element represents a first application installed on or accessible by the electronic device 100. In an embodiment, the functionality management device 102 may detect the input entered with respect to the graphical element displayed on the display 108 of the electronic device 100.

At step 904, the method includes generating at least one sub-graphical element from the graphical element. In an exemplary embodiment, the functional management device 102 may generate the least one sub-graphical element from the graphical element. The at least one sub-graphical element represents a functional data item associated with the first application.

At step 906, the method includes controlling the display to display the at least one sub-graphical element. In an exemplary embodiment, the functionality management device 102 may control the display to display the at least one sub-graphical element.

At step 908, the method includes detecting an association event input with respect to a second application and the functional data item associated with the first application. In an exemplary embodiment, the functionality management device 102 may detect the association event input with respect to the second application and the functional data item associated with the first application.

At step 910, the method includes dynamically creating at least one policy based on the association event. In an exemplary embodiment, the functionality management device 102 may dynamically create at least one policy based on the association event.

At step 912, the method includes applying the at least one policy to the second application. In an exemplary embodiment, the functional management device 102 may apply the at least one policy to the second application.

The various actions, acts, blocks, steps, or the like in the method of the flow diagram 900 may be performed in the order presented, in a different order or simultaneously. Further, in some exemplary embodiments, some of the actions, acts, blocks, steps, or the like may be omitted, added, modified, skipped, or the like without departing from the scope of the disclosure.

Figure 10:
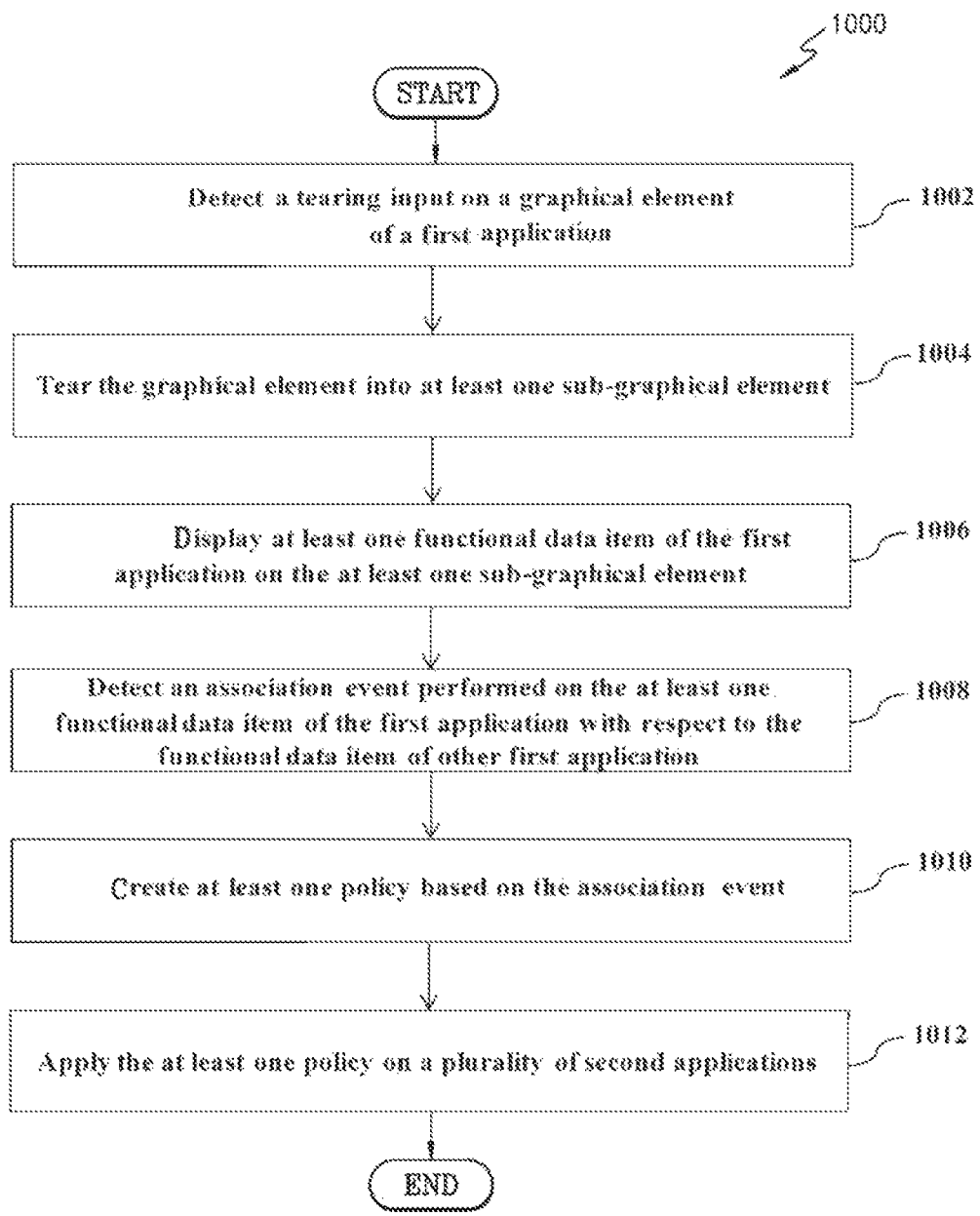
FIG. 10 is another flow diagram illustrating a method of managing functionality of applications, according to an exemplary embodiment.

FIG. 10 is a flow diagram 1000 illustrating a method of managing functionality of applications of the electronic device 100, according to an exemplary embodiment as disclosed herein. At step 1002, the method includes detecting an input entered with respect to a graphical element displayed on a display 108 of the electronic device. The graphical element represents a first application installed on or accessible by the electronic device 100. In an exemplary embodiment, the functionality management device 102 may detect may detect the input entered with respect to the graphical element displayed on the display 108 of the electronic device 100.

At step 1004, the method includes generating at least one sub-graphical element from the graphical element. In an exemplary embodiment, the functional management device 102 may generate the least one sub-graphical element from the graphical element. The at least one sub-graphical element represents a functional data item associated with the first application.

At step 1006, the method includes controlling the display to display the at least one sub-graphical element. In an exemplary embodiment, the functional management device 102 may control the display to display the at least one sub-graphical element.

At step 1008 the method includes detecting an association event input with respect to a second application and the functional data item associated with the first application. In an exemplary embodiment, the functional management device 102 may detect an association event input with respect to a second application and the functional data item associated with the first application.

At step 1010, the method includes dynamically creating at least one policy based on the association event. In an exemplary embodiment, the functional management device 102 may dynamically create at least one policy based on the association event.

Figure 11:
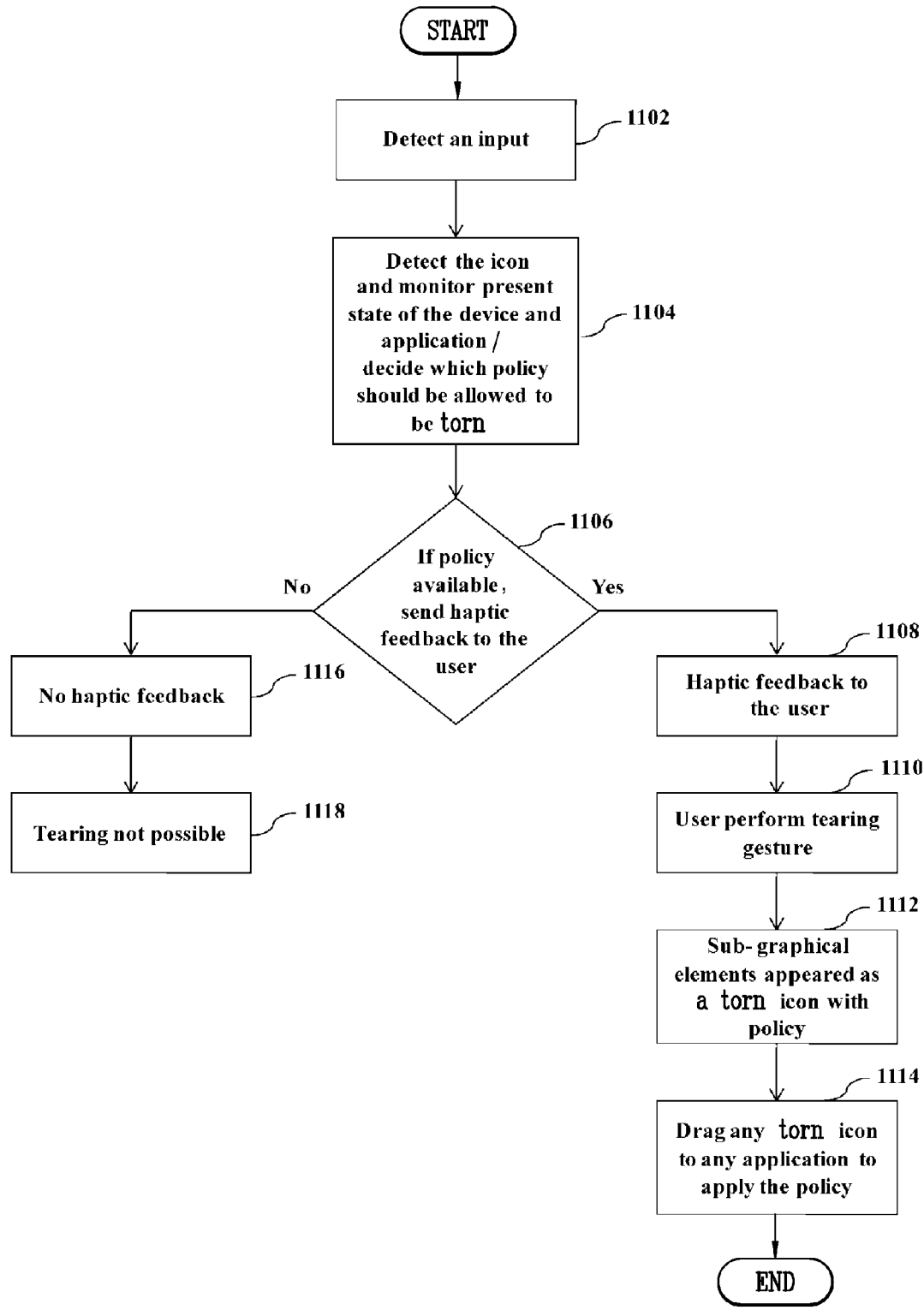
FIG. 11 is a flow diagram illustrating a method of generating at least one sub-graphical element from the graphical element displayed on the display of the electronic device, according to an exemplary embodiment.

At step 1012, the method includes applying the at least one policy to the second application and/or one or more applications other than the first application and the second application. In an exemplary embodiment, the functional management device 102 may apply the at least one policy to the second application and/or one or more applications other than the first application and the second application. According to an exemplary embodiment, the functional management device 102 may apply the at least one policy to a plurality of applications. FIG. 11 is a flow diagram illustrating a method of generating at least one sub-graphical element from a graphical element displayed on the display 108 of the electronic device 100, according to an exemplary embodiment as disclosed herein. At step 1102, the method includes detecting an input entered by a user with respect to the graphical element (e.g., a multi-touch gesture, a tap and hold gesture, a pinch open gesture, etc. as detailed with respect to FIG. 4). At step 1104, the method includes identifying an application (e.g., a first application) corresponding to the graphical element and monitoring the present state of the electronic device 100 and the present state of the first application. The functionality management device 102 may then determine whether any policies associated with the first application may be applied to another application (e.g., provide the user with options to apply one or more policies associated with the first application to a second application). Policies are described above, for example, with respect to FIG. 5 and FIG. 6.

At step 1106, the method includes determining whether one or more policies are available. Upon determining a policy is available, the method proceeds to step 1108, which includes sending device feedback (e.g., haptic feedback, audible feedback, visual feedback, etc.) to the user. At step 1110, the method includes receiving an input (i.e., long press, swipe, pinch and zoom, or the like) from the user. At step 1112, the method includes generating sub-graphical elements based on the user input and displaying the sub-graphical elements. Each of the sub-graphical elements may be associated with a policy included in the policy database 118. At step 1114, the method includes receiving a user input of dragging and dropping a sub-graphical element to a graphical element representing an application (e.g., a third application) and accordingly applying a policy associated with the dragged and dropped sub-graphical element to the application (e.g., the third application).

If the functionality management device 102 determines, at step 1106, determines that no policies are associated with the first application, the method proceeds to step 1116, which includes sending no device feedback to the user. Alternatively, the functionality management device 102 may send visual feedback to the user (e.g., a notification message, without haptic or audible feedback) indicating that no policies associated with the first application are available. At step 1118, the method terminates the operations of generating at least one sub-graphical element.

The various actions, acts, blocks, steps, or the like in the method of the flow diagram 1100 may be performed in the order presented. In a different order or simultaneously. Further, in some exemplary embodiments, some of the actions, acts, blocks, steps, or the like may be omitted, added, modified, skipped, or the like without departing from the scope of the disclosure.

FIG. 12 is an example illustration in which sub-graphical elements are generated from a graphical element, according to an exemplary embodiment as disclosed herein. The functionality management device 102 may generate and display one or more sub-graphical elements (e.g., WI-FI secure 1202 and the WI-FI unsecured 1204) from a graphical element (e.g., graphical element 1200 representing a WI-FI application) displayed on to the display 108. The functionality management device 102 may select the sub-graphical elements based on the present state (i.e., the present state of the electronic device 100 and the present state of the first application).

Unlike related art systems and methods, the method according to one or more exemplary embodiments can enable the user to selectively apply functionalities of the sub-graphical elements. For example, the user may drag the sub-graphical element WI-FI secure 1202 to the graphical element Email 1206 which represents an Email application. In addition, the user may drag the sub-graphical element WI-FI unsecured 1204 to the graphical element Video Player 1208 which represents a Video player application.

Thus, the method according to one or more of exemplary embodiment provides for creating dynamic policies and selectively applying the dynamic policies to applications, rather than forcing a user to apply a policy to all applications installed on the electronic device 100. For example, the Email application can be limited to transmitting/receiving data only when the electronic device 100 is connected to a secure WI-FI network connection, and the Video player application can be limited to transmitting/streaming data/videos only when the electronic device 100 is connected to an unsecured WI-FI network connection, without imposing the same limitations on other applications installed on the electronic device 100.

Figure 17A:
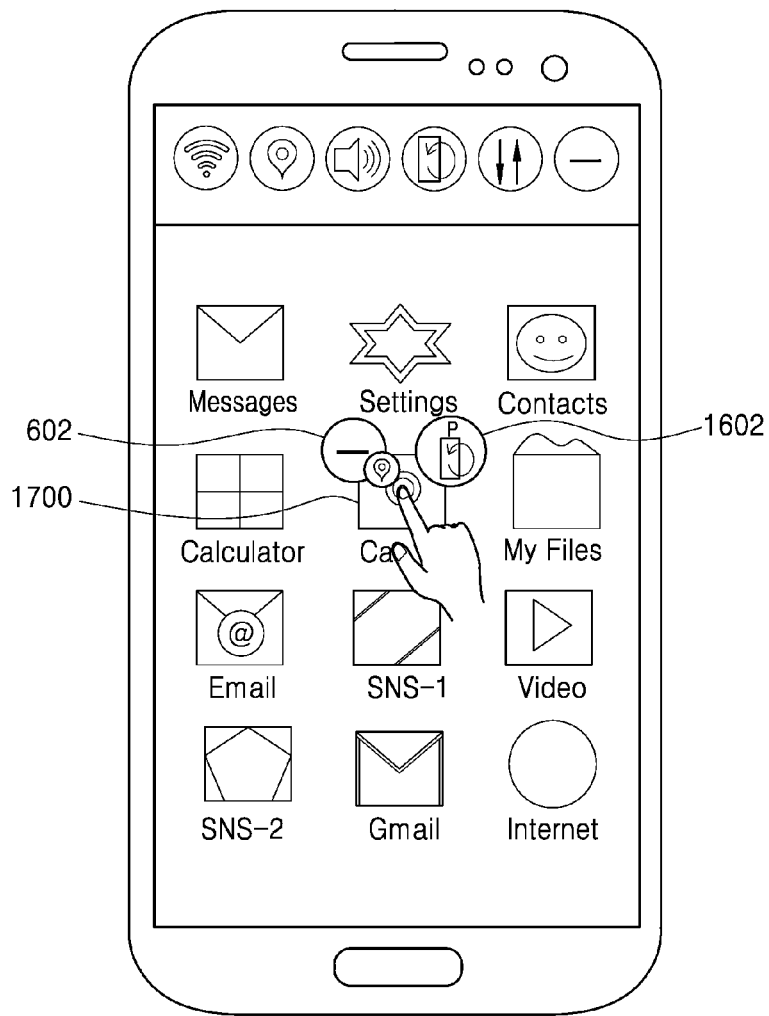
FIGS. 17A and 17B show an illustration in which an applied policy is disabled (reversed) in response to an input from a user, according to an exemplary embodiment.
Figure 17B:
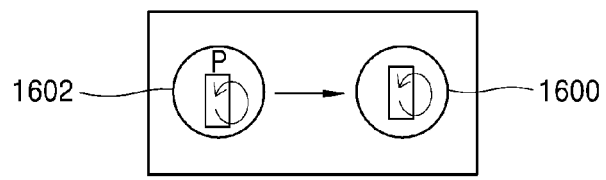

Further, the user may undo or modify an applied policy (or a functionality included in the applied policy) by inputting a gesture with respect to a sub-graphical element representing the applied policy (or the functionality included in the applied policy), as shown in the FIGS. 17A and 17B.

Figure 13A:
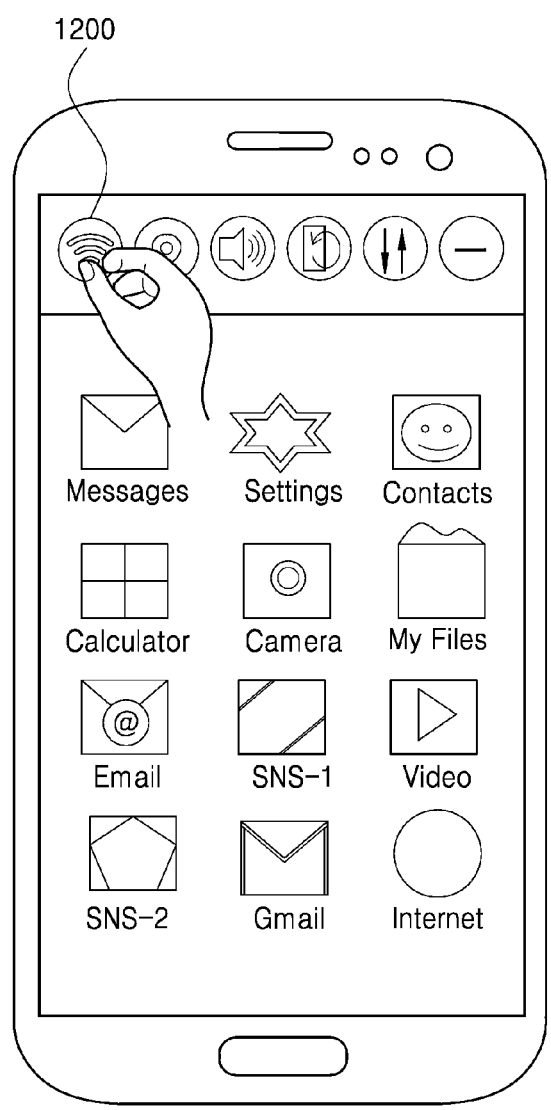
FIGS. 13A, 13B and 13C show an illustration in which a dynamic policy is created and maintained in the dynamic policies of a policy database, according to an exemplary embodiment.
Figure 13B:
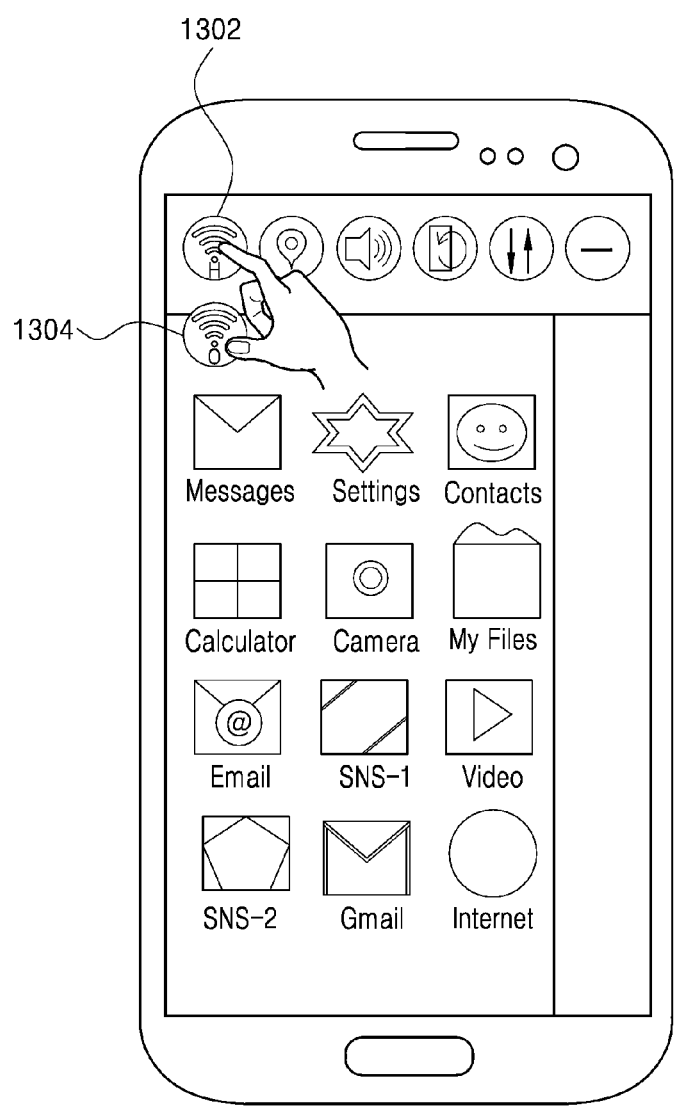
Figure 13C:
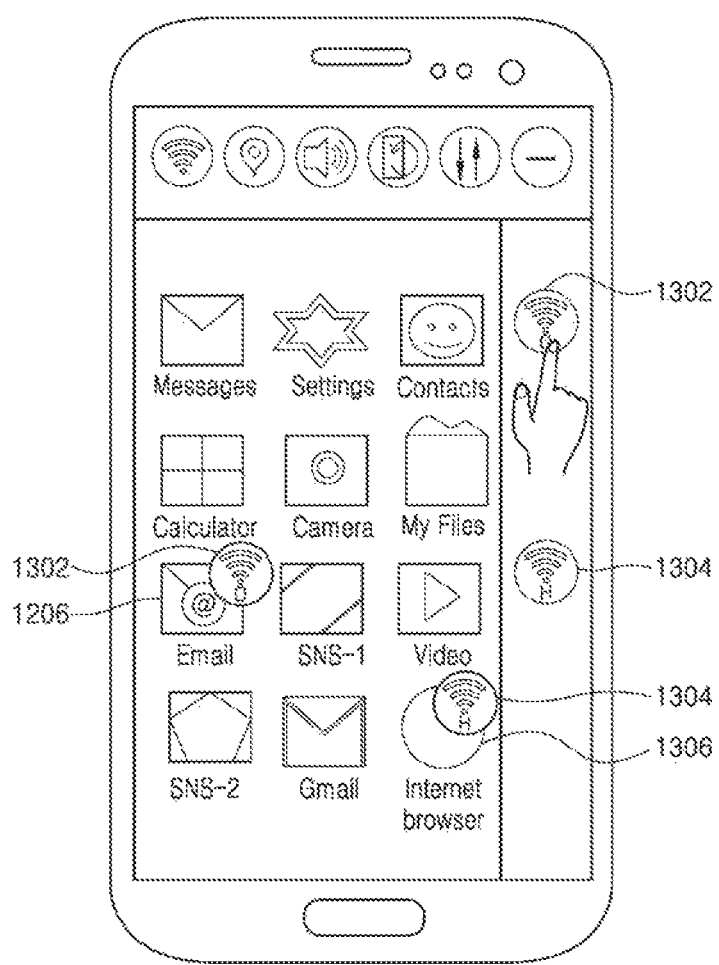

FIGS. 13A, 13B and 13C show an example illustration in which the dynamic policy is created and maintained in the dynamic policies 506 of the policy database 118, according to an exemplary embodiment as disclosed herein. The functionality management device 102 receives a user input entered with respect to graphical element 1200 representing a WI-FI application (as shown in FIG. 13A). The functionality management device 102 may determine how many sub-graphical elements to generate with respect to the graphical element 1200 representing the WI-FI application. For example, the functionality management device 102 may check for available WI-FI networks and generate a sub-graphical element for each WI-FI network already saved to the electronic device 100, in addition to available networks (e.g., connected WI-FI network, favorite WI-FI network, and most accessed WI-FI network, or any other saved WI-FI network). For example, as shown in FIG. 13B, the display 108, coupled to the functionality management device 102, displays sub-graphical elements representing saved/most accessed WI-FI networks (e.g., a sub-graphical element 1302 representing WI-FI Office (WI-FI O) and a sub-graphical element 1304 representing WI-FI home (WI-FI H)). The user drags and drops (i.e., association event) the sub-graphical elements 1302 and 1304 onto one or more graphical elements representing applications different from the WI-FI application (e.g., onto the graphical element Email 1206 and the graphical element Internet Browser 1306), and the display displays the sub-graphical elements 1302 and 1304 over the graphical elements Email 1206 and Internet Browser 1306 and in a side portion of the display 108, as shown in FIG. 13C.

The functionality management device 102 dynamically creates at least one policy based on the association event and applies the at least one policy to the second application, or to one or more applications other than the first application. The functionality management device 102 applies, for example, a policy (e.g., functionality of WI-FI Office (WI-FI O)) to the Email application (represented by graphical element Email 1206), such that the Email application is only able to transmit/receive data when the electronic device 100 is connected to WI-FI Office (WI-FI O). In another example, the Email application may automatically open and/or transmit/receive data when the electronic device 100 connects to WI-FI Office (Wi-Fi O). The WI-FI-H 1304 functionality is applied to a graphical element of the internet browser application 1306 (as shown in FIG. 13C), where the internet browser application 1306 launches (operations) once the electronic device 100 connects to the services of the WI-FI-H 1304 only. The functionality management device 102 also applies, for example, a policy (e.g., functionality of WI-FI Home (WI-FI H)) to the Internet Browser application (represented by graphical element Internet Browser 1306), such that the Internet Browser is only able to transmit/receive data when the electronic device 100 is connected to WI-FI Home (WI-FI H). In another example, the Internet Browser may automatically open and/or transmit/receive data when the electronic device 100 connects to WI-FI Home (WI-FI H). The at least one dynamic policy is maintained in the dynamic policies 506 of the policy database 18.

Unlike related art systems and methods, the user may have control over data access and application execution rights, and any other location based functionalities, on an application specific basis without making changes to network configurations or device functionalities.

The dynamic policy includes monitoring the activity of the applications (both first and second applications) and settings of the applications. The dynamic policy can be created based on the activity monitoring described above. The dynamic policies are maintained in the dynamic policies 506 stored in the policy database 118.

The dynamic functionalities are created based on usage of electronic device 100 by the user, state of the electronic device 100, state of an application, network states or the policies applied in any application implementation, as shown in the example dynamic functionalities database below in Table 8.

TABLE 8

| Graphical element | Functionality available | Functionality type | Module to enable/disable functionality |
| --- | --- | --- | --- |
| Wi-Fi | Home | Dynamic | Network module |
| Wi-Fi | Office | Dynamic | Network module |
| Wi-Fi | Work | Dynamic | Network module |

Figure 14A:
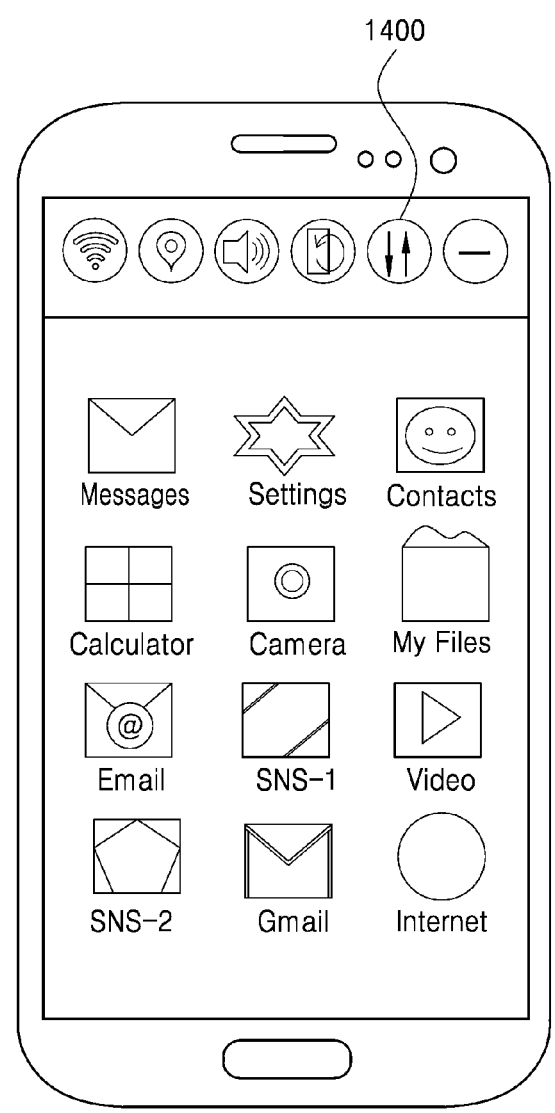
FIGS. 14A, 14B and 14C show another illustration in which a dynamic policy is created and maintained in the dynamic policies of the policy database, according to an exemplary embodiment.
Figure 14B:
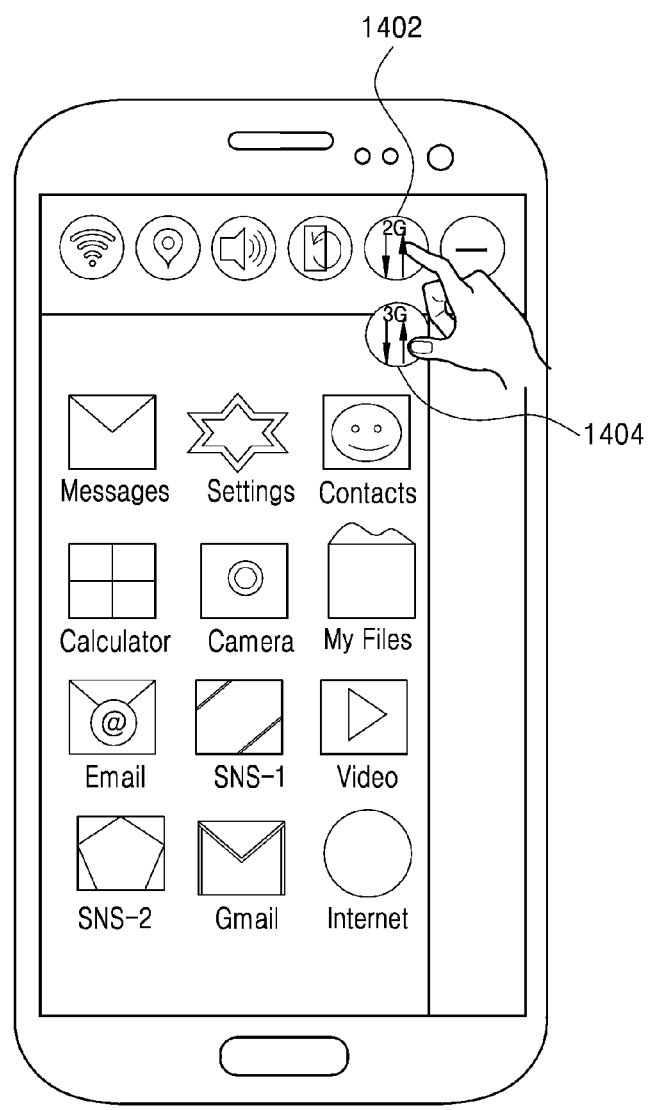
Figure 14C:
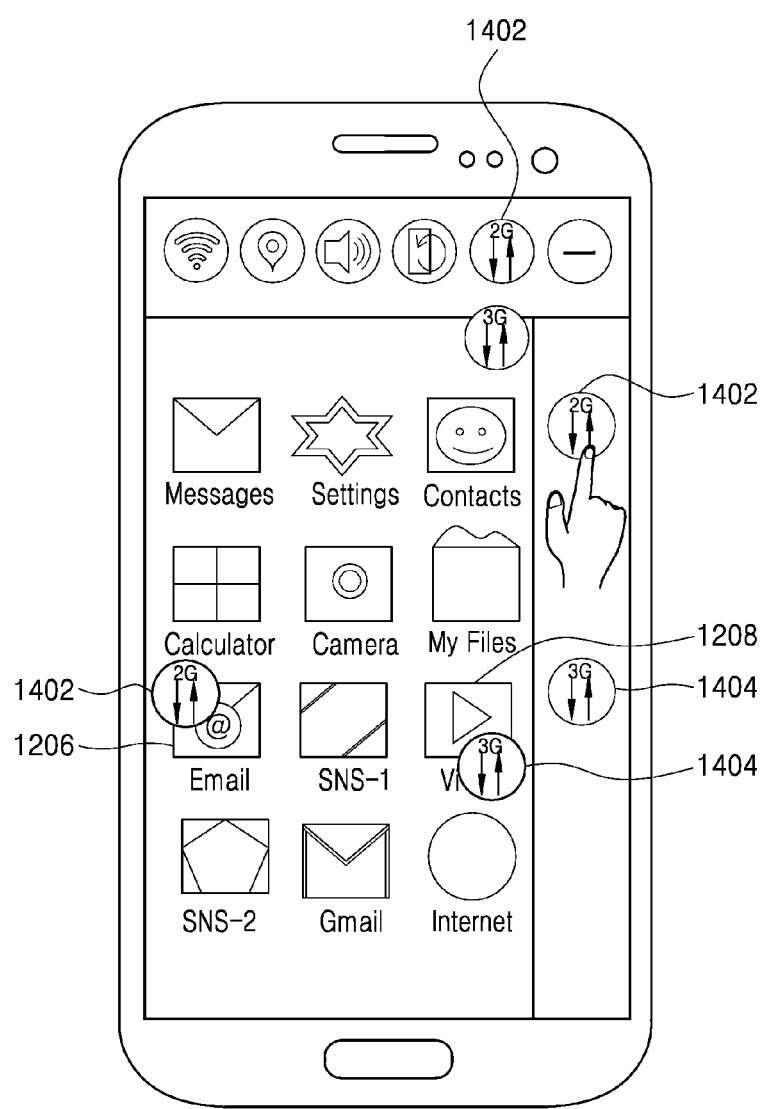

FIGS. 14A, 14B and 14C show another example illustration in which the dynamic policy is created and maintained in the dynamic policies 506 of the policy database 118, according to an exemplary embodiment as disclosed herein. The electronic device 100 can switch between 2G, 3G, and 4G mobile networks, and the functionality management device 102 can dynamically select a functionality (e.g., select networks most frequently connected to by the electronic device). Hence, the functionality management system 102 intelligently establishes connections to mobile networks depending upon the network connection strength between the electronic device 100 and the mobile networks. The functionality management device 102 receives a user input entered with respect to graphical element 1400 representing the mobile data application (as shown in FIG. 14A). The functionality management device 102 may determine how many sub-graphical elements to generate with respect to the graphical element 1400 representing the mobile data application. For example, the functionality management device 102 may check for available mobile data networks and generate a sub-graphical element for each mobile data network already saved to the electronic device 100, in addition to available networks (e.g., connected mobile data network, favorite mobile data network, and most accessed mobile data network, or any other saved mobile data network) For example, as shown in FIG. 14B, the display 108, coupled to the functionality management device 102, displays sub-graphical elements representing saved/most accessed mobile data networks (e.g., a sub-graphical element 1402 representing a 2G mobile data network and a sub-graphical element 1404 representing a 3G mobile data network. The user drags and drops (i.e., association event) the sub-graphical elements 1402 and 1404 onto one or more graphical elements representing applications different from the mobile data network application (e.g., onto the graphical element Email 1206 and the graphical element Video 1208), and the display displays the sub-graphical elements 1402 and 1404 over the graphical elements Email 1206 and Video 1208 and in a side portion of the display 108, as shown in FIG. 14C.

The functionality management device 102 dynamically creates at least one policy based on the association event and applies the at least one policy to the second application, or to one or more applications other than the first application. The functionality management device 102 applies, for example, a policy (e.g., functionality of the 2G mobile data network) to the Email application (represented by graphical element Email 1206), such that the Email application is only able to transmit/receive data when the electronic device 100 is connected to the 2G mobile data network. In another example, the Email application may transmit/receive data when the electronic device 100 is connected at least to a 2G mobile network or faster. The functionality management device 102 also applies, for example, a policy (e.g., functionality of the 3G mobile data network to a Video application (represented by graphical element Video 1208), such that the Video application is only able to transmit/stream data when the electronic device 100 is connected to a 3G mobile data network or faster.

The at least one dynamic policy of the mobile data network application is maintained in the dynamic policies 506 of the policy database 118 (Table 9).

TABLE 9

| Graphical element | Functionality available | Functionality type | Module to enable/disable functionality |
|---|---|---|---|
| Mobile data | 3 G | Dynamic | Network module |
| Mobile data | 2 G | Dynamic | Network module |

In another example, the electronic device 100 may extract a policy applied to a camera application and apply the same policy to another application installed on the electronic device 100. For example, a restriction implemented for the camera application disables the camera flash when the battery level of the electronic device is 5% or less. The electronic device may extract and apply this policy to any application, such as a messaging application (e.g., disable message notifications whenever the battery level is 5% or less).

Figure 15A:
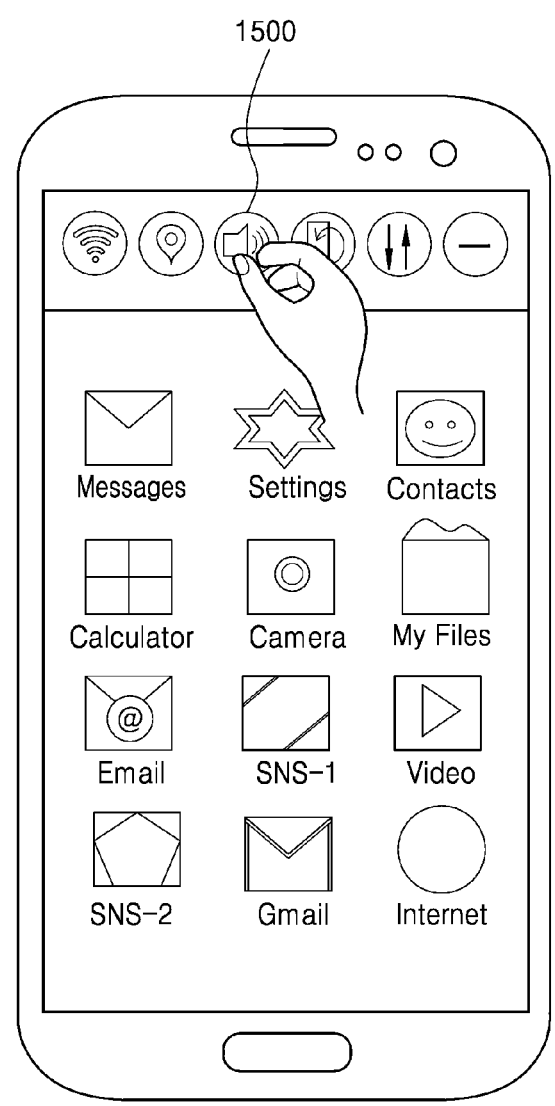
FIGS. 15A, 15B and 15C show an illustration in which a system functionality is created and maintained in the system policies of the policy database, according to an exemplary embodiment.
Figure 15B:
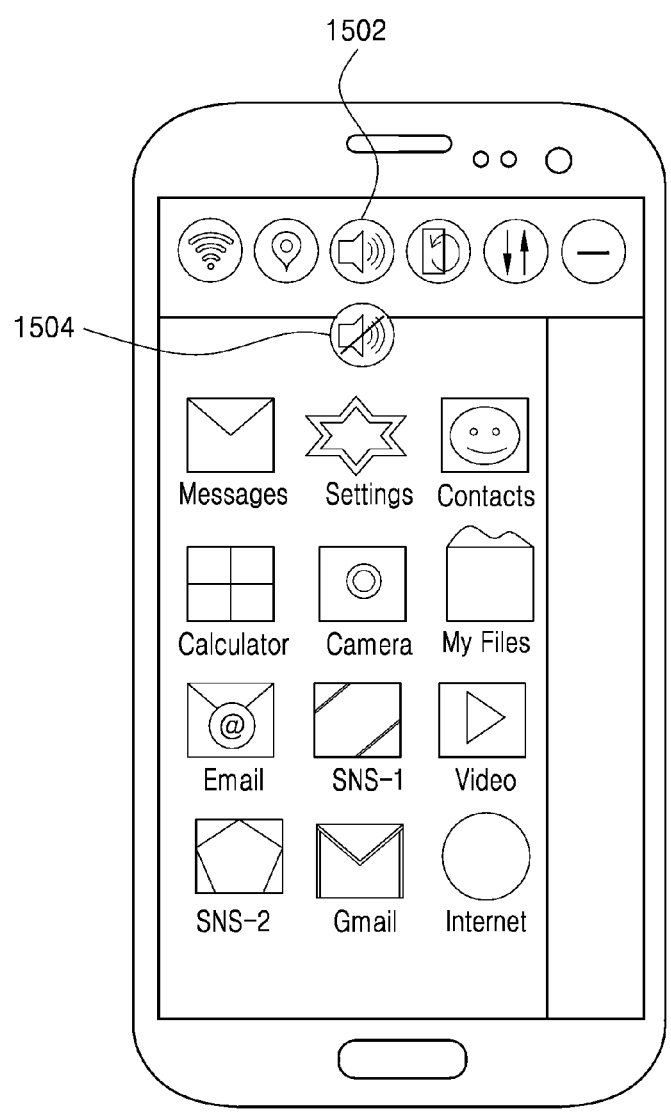
Figure 15C:
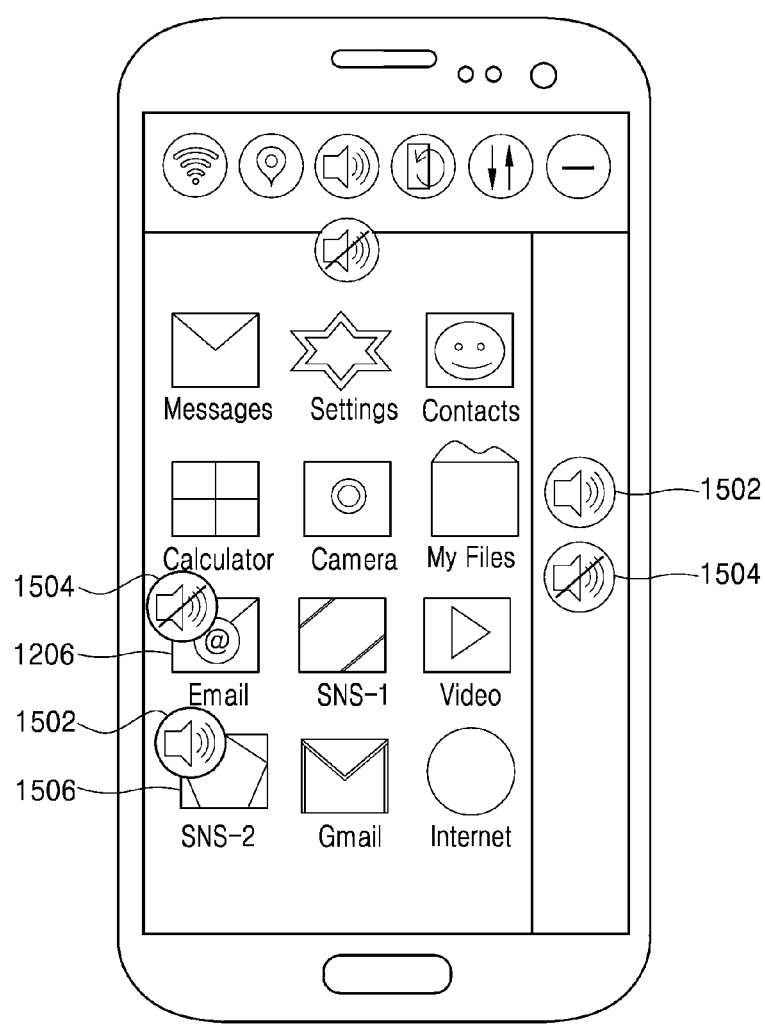

FIGS. 15A, 15B and 15C show an example illustration in which the system functionality is created and maintained in the system policies 502 of the policy database 118, according to an exemplary embodiment as disclosed herein. The functionality management device 102 receives a user input entered with respect to graphical element 1500 representing a sound application (as shown in FIG. 15A). The functionality management device 102 may determine how many sub-graphical elements to generate with respect to the graphical element 1500 representing the sound application. For example, the functionality management device 102 may check for available sound options (e.g. configurations or profiles) and generate a sub-graphical element for each sound option. For example, as shown in FIG. 15B, the display 108, coupled to the functionality management device 102, displays sub-graphical element 1502 representing a sound option for unmuting notifications and a sub-graphical element 1504 representing a sound option for muting notifications. The user drags and drops (i.e., association event) the sub-graphical elements 1502 and 1504 onto one or more graphical elements representing applications different from the sound application (e.g., onto the graphical element Email 1206 and the graphical element SNS-2 1506 representing a Social Networking Application).

The functionality management device 102 creates at least one policy based on the association event and applies the at least one policy to the second application, or to one or more applications other than the first application. The functionality management device 102 applies, for example, a policy (e.g., mute functionality) to the Email application (represented by graphical element Email 1206), such that all notifications are muted for the Email application. The functionality management device 102 also applies, for example, a policy (e.g., unmute functionality) to the Social Networking application, such all audio notifications (e.g., sound, ringtone, and the like) are enabled.

Further, in addition to displaying the sub-graphical elements 1502 and 1504 over the graphical elements Email 1206 and SNS-2 1506, the display 108 may display the sub-graphical elements in a side portion of the display 108, as shown in FIG. 15C. The at least one system policy of the sound application is maintained in the system policies 502 of the policy database 118. The user can further utilize the sub-graphical elements on to the display 108 to, for example, disable the functionality associated therewith, or apply the functionality to another application.

System policies 502 may include policies defined by the system or vendor during manufacture of the electronic device 100, for example, mute/unmute, Blocking Mode, screen rotation (landscape or portrait), or the like, as shown below in the system policies 502 of the policy database 118 (Table 10).

TABLE 10

| Graphical element | Functionality available | Functionality type | Module to enable/disable functionality |
|---|---|---|---|
| Wi-Fi | Wi-Fi ON | System | Wi-Fi module |
| Wi-Fi | Wi-Fi OFF | System | Wi-Fi module |

Figure 16A:
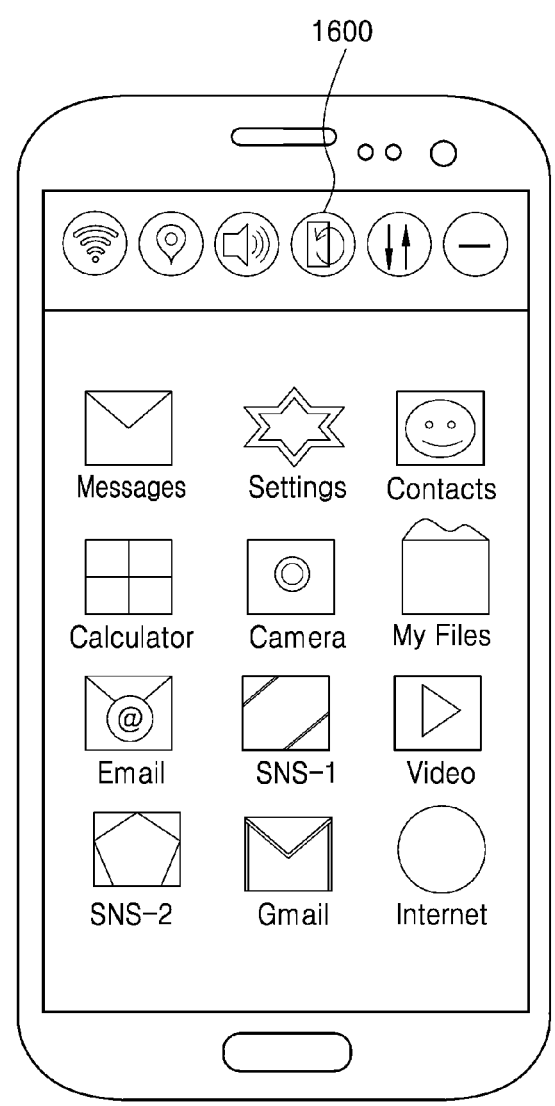
FIGS. 16A, 16B and 16C show another illustration in which a system functionality is created and maintained in the system policies of the policy database according to an exemplary embodiment.
Figure 16B:
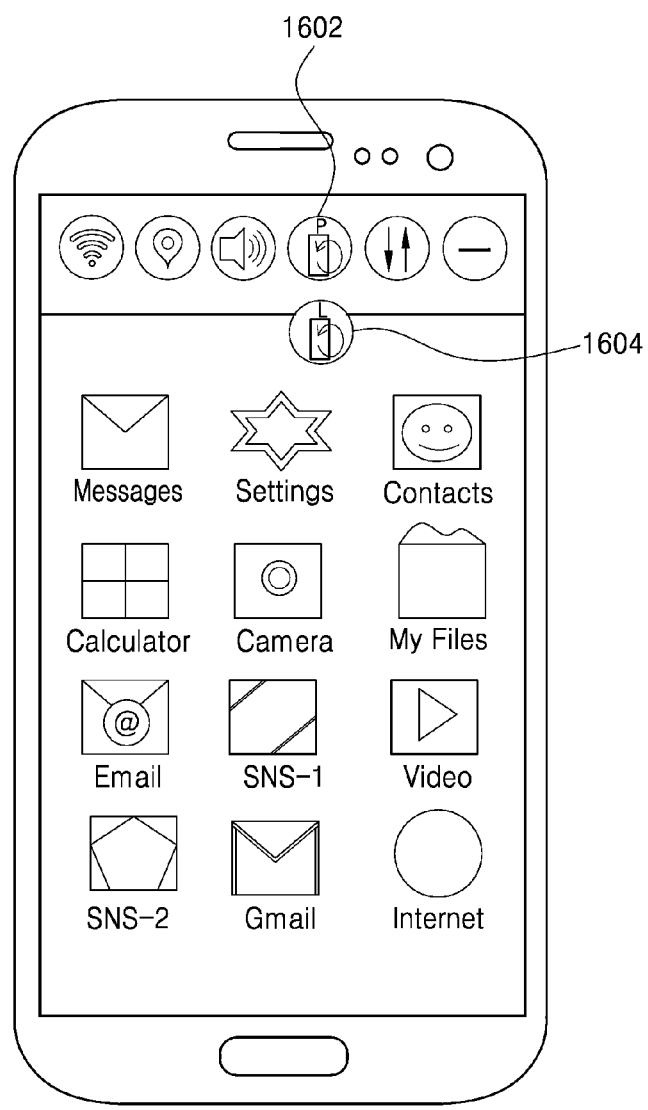
Figure 16C:
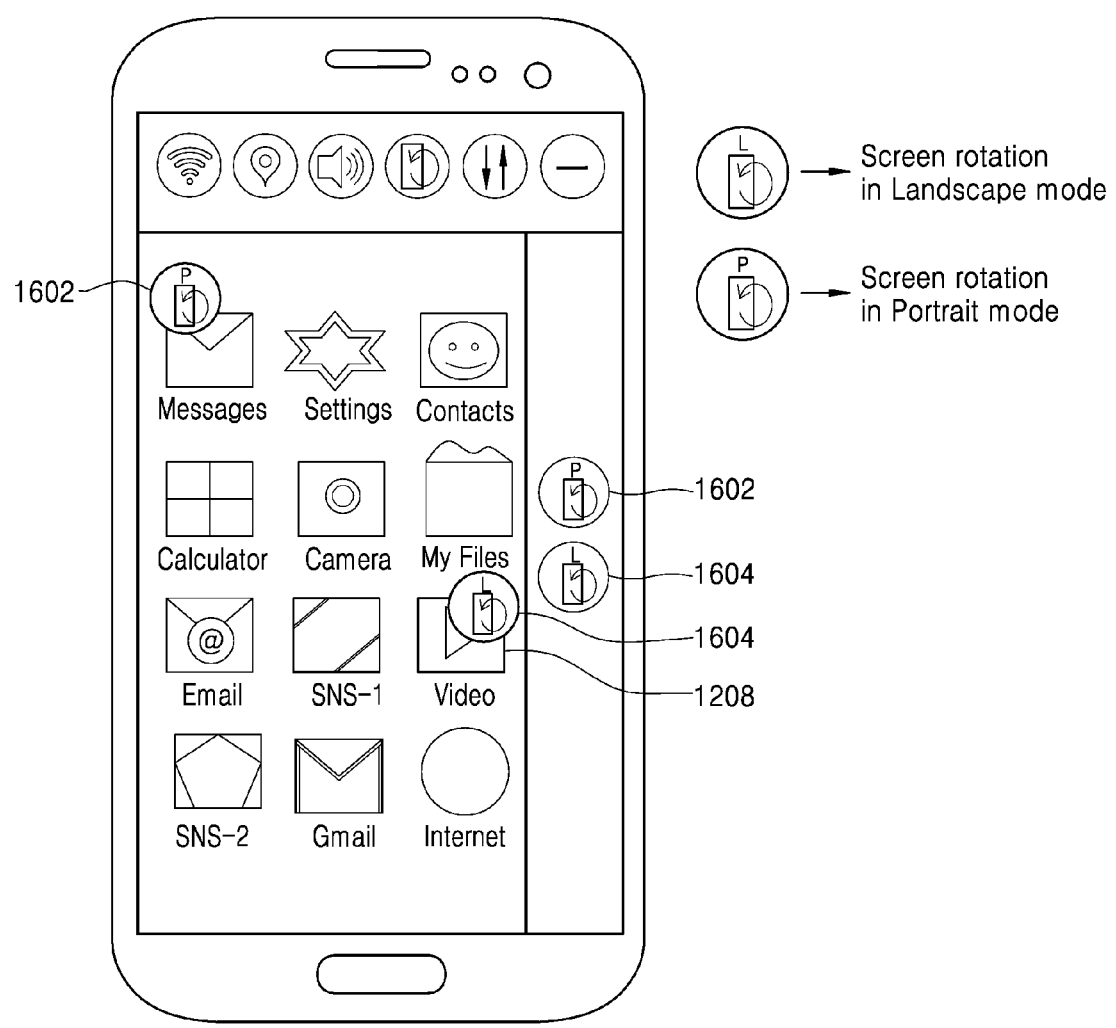

FIGS. 16A, 16B and 16C show another example illustration in which a system functionality is created and maintained in the system policies 502 of the policy database 118, according to an exemplary embodiment as disclosed herein. The functionality management device 102 receives a user input entered with respect to graphical element 1600 representing a screen orientation application (as shown in FIG. 16A). The functionality management device 102 may determine how many sub-graphical elements to generate with respect to the graphical element 1600 representing the screen orientation application. For example, the functionality management device 102 may check for available screen orientation options (e.g. configurations or profiles) and generate a sub-graphical element for each screen orientation option. For example, as shown in FIG. 16B, the display 108, coupled to the functionality management device 102, displays sub-graphical element 1602 representing a Portrait mode orientation option and a sub-graphical element 1604 representing a Landscape mode orientation option. The user drags and drops (i.e., association event) the sub-graphical elements 1602 and 1604 onto one or more graphical elements representing applications different from the screen orientation application (e.g., onto the graphical element Messages and the graphical element Video 1208 representing a Video application).

The functionality management device 102 creates the at least one policy based on the association event and applies the at least one policy to the second application. The user can now control the screen rotation based on application. Thus, according to one or more exemplary embodiment, the video application may operate in landscape mode. Further, the messaging application launches and operates in portrait mode (as shown in FIG. 16C).

Further, in addition to displaying the sub-graphical elements 1502 and 1504 over the graphical elements Email 1206 and SNS-2 1506, the display 108 may display the sub-graphical elements in a side portion of the display 108, as shown in FIG. 16C.

The FIGS. 17A and 17B is an example illustration in which an applied policy is disabled (reversed) in response to an input from a user, according to an exemplary embodiment as disclosed herein. The input may be, for example, a gesture such as a long press or a swipe input on the sub-graphical element corresponding to the functional data item. As shown, the functional data item (e.g., portrait mode) of the screen orientation application 1600 applied to the camera application 1700 can be disabled (reversed) by performing a swipe gesture. As shown, in FIG. 17B the Portrait mode orientation option is disabled (i.e., the Portrait mode orientation option is no longer applied to the Camera application).

Figure 18A:
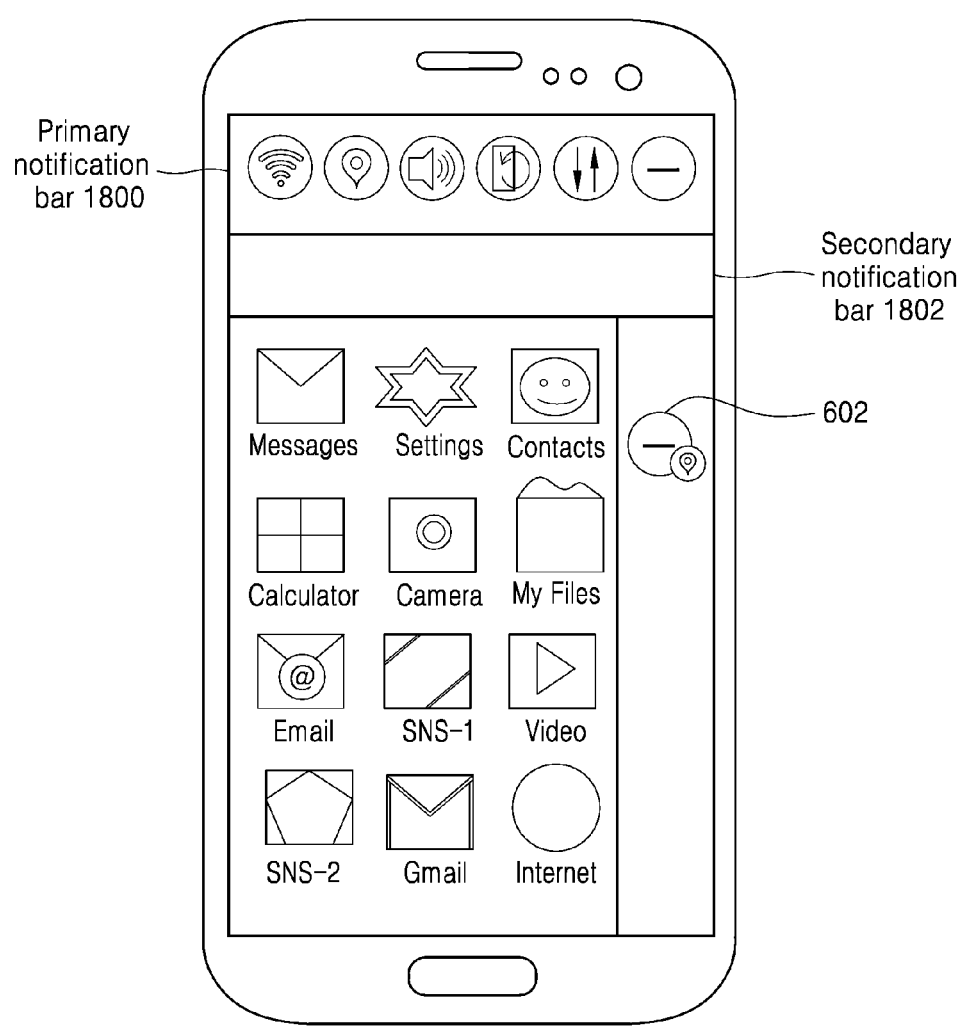
FIGS. 18A and 18B show an illustration in which dragging a sub-graphical element to a functionality region on the display applies a functional data item associated with the sub-graphical element to all applications installed on the electronic device, according to an exemplary embodiment.
Figure 18B:
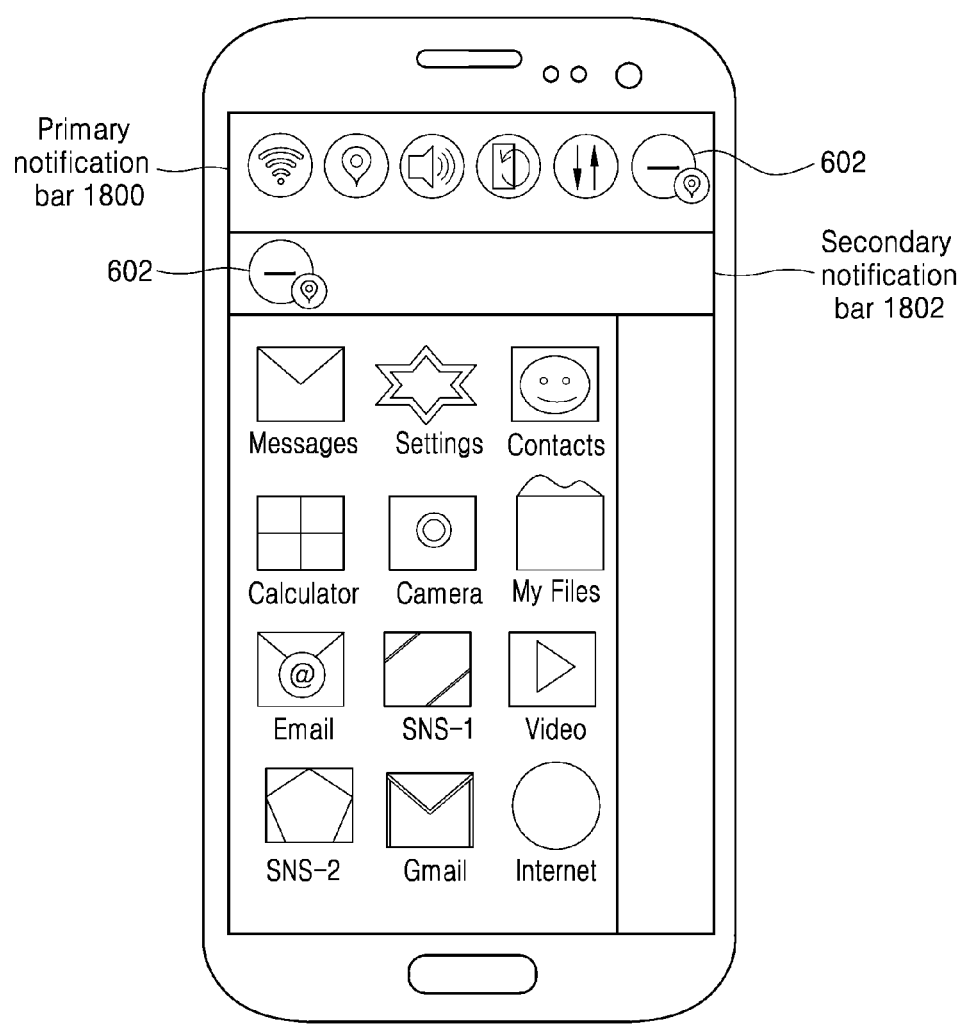

FIGS. 18A and 18B show an example illustration in which dragging a sub-graphical element to a functionality display region (e.g., a notification bar, edge portion of a display, a folder icon) on the display 108 applies a functional data item associated with the sub-graphical element to all applications installed on the electronic device 100, according to an exemplary embodiment as disclosed herein. The user may drag and drop a sub-graphical element onto a notification bar (e.g., primary notification bar 1800 or secondary notification bar 1802) of the electronic device 100 (as shown in FIG. 18A), and thereby apply the functionality data item associated with the sub-graphical element. In this manner, for example, functionalities respectively associated with sub-graphical elements may be applied to all applications installed on the electronic device 100. For example, referring back to the derived policy (Blocking Mode+Location-O) represented by graphical element 602, as described above with respect to FIG. 6, when the graphical element 602 is dragged and dropped onto the notification bar (e.g., primary notification bar 1800 or secondary notification bar 1802) of the electronic device 100, the electronic device 100 applies the derived functionality to all applications installed on the electronic device 100. That is, the electronic device 100 disables notifications, calls, the LED indicator, and the like, for all applications when the electronic device 100 is at Location-O.

In an exemplary embodiment, the functionality region can be located anywhere on the display 108 of the electronic device 100.

Figure 19A:
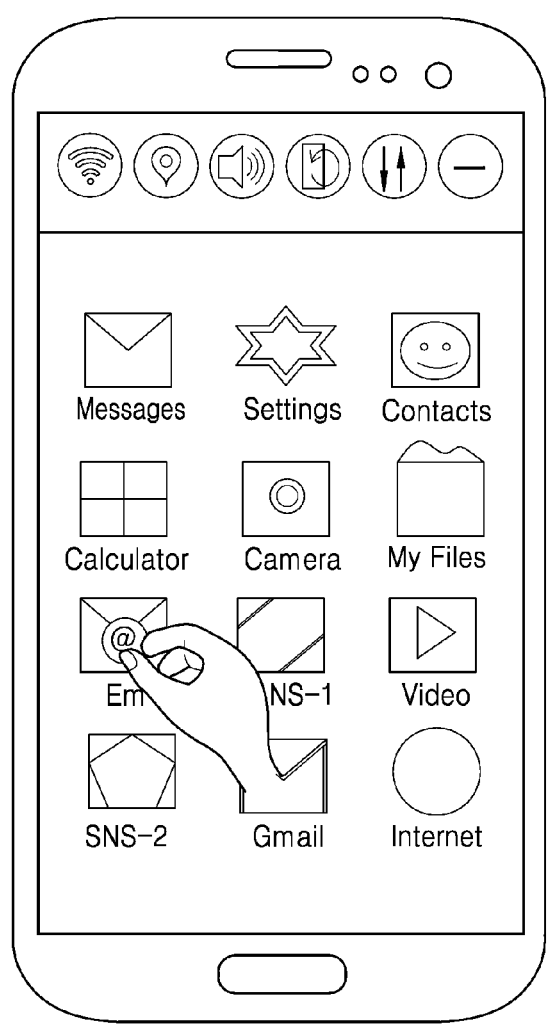
FIGS. 19A and 19B show an illustration of displaying sub-graphical elements representing functional data items which are associated with the first application and currently applied to the second application, according to an exemplary embodiment.
Figure 19B:
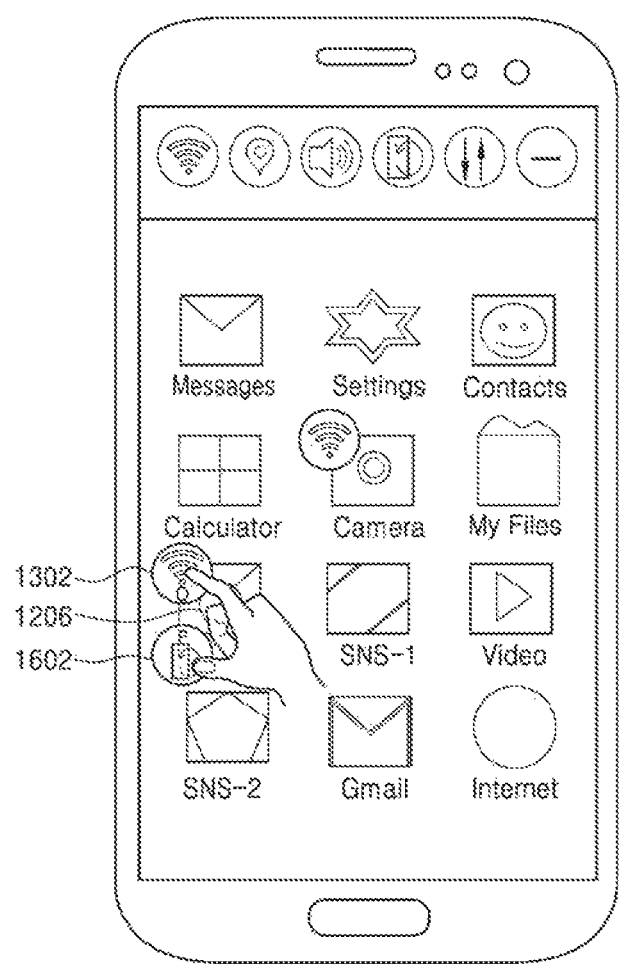

FIGS. 19A and 19B is an example illustration of displaying sub-graphical elements representing functional data items which are associated with the first application and currently applied to the second application, according to an exemplary embodiment as disclosed herein. When the system (e.g., functional management device 102) creates a new functionality based on usage frequency of a particular application, state and condition of the electronic device 100, the electronic device 100 may automatically update the functional data item database 116 with applications listed according to corresponding utilized functionalities. For example, the functional management device 102 may create sub-graphical element 1302 representing WI-FI Office (WI-FI O) based on a relatively high usage frequency of WI-FI Office (WI-FI O). In the example of FIG. 19B, the user of the electronic device 100 may view which functionalities are applied to the Email application (e.g., WI-FI Office and Portrait mode orientation) by entering an input (e.g., a pinch open input) with respect to the graphical element Email 1206. Further in the example, the user may selectively disable (i.e. remove) the functionality regarding WI-FI Office (WI-FI O) from the Email application by entering an additional input (e.g. a swipe input which begins at the sub-graphical element 1302).

Thus, the user of the electronic device 100 may selectively remove functionalities from desired applications.

Figure 20:
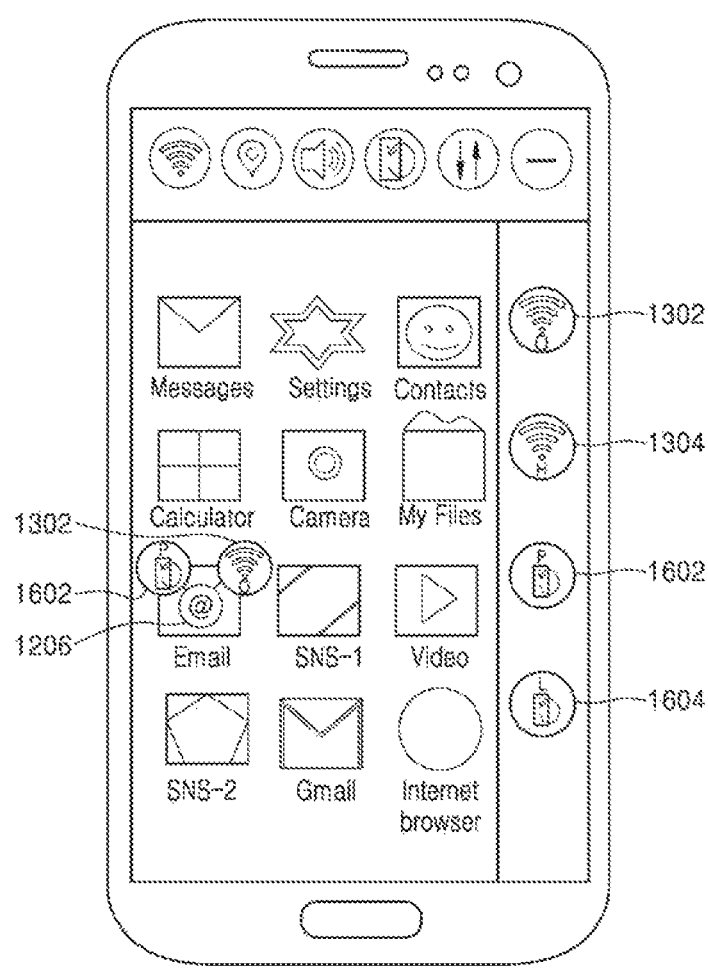
FIG. 20 is an illustration of applying multiple functional data items to an application, according to an exemplary embodiment.

FIG. 20 is an example illustration of applying multiple functional data items to an application, according to an exemplary embodiment as disclosed herein. For example, any derived policy (e.g., Blocking Mode+Location-O), dynamic policy (e.g., WI-FI-O), system policy (e.g., Landscape mode orientation+Video application), and/or user created functionality (e.g., combination of a derived policy, dynamic policy, and system policy) can be placed and stored in a functionality region. Thus, the user can drag multiple functionalities from a functionality region (e.g., the right portion of the display) onto the graphical element Email 1206 of the Email application, (as shown in FIG. 20). According to an exemplary embodiment, the functionality region is a designated area on a display screen, which displays icons representing different functional data items.

Figure 21:
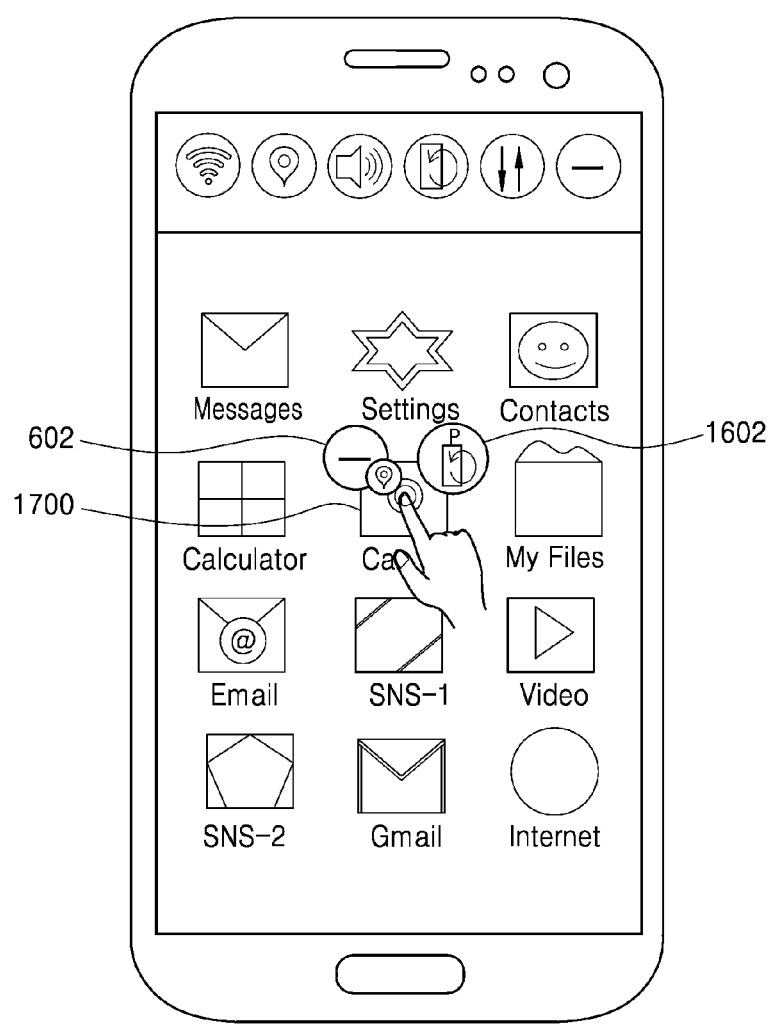
FIG. 21 illustrates an exemplary embodiment, in which, policies applied to an second application are imposed.

FIG. 21 illustrates an exemplary embodiment, in which, the policies applied to an application are imposed. The user may input a gesture with respect to the graphical element Camera 1700 of representing a camera application to determine the number of the policies currently applied thereto. The display 108 may display one or more sub-graphical elements which correspond to functional data items applied to the camera application.

Figure 22:
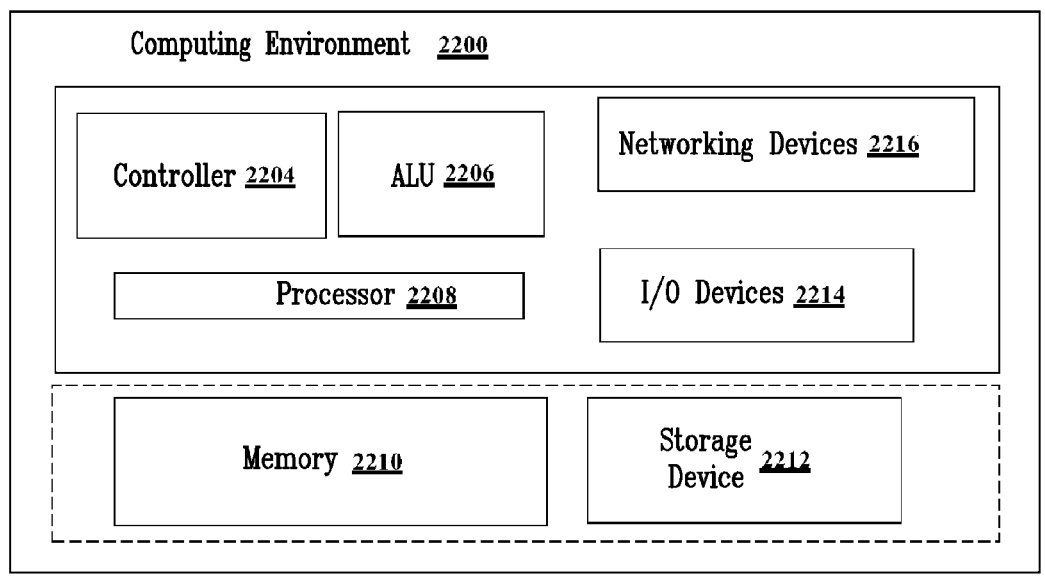
FIG. 22 illustrates a computing environment implementing the method of managing functionality of applications in the electronic device, according to an exemplary embodiment.

FIG. 22 illustrates a computing environment implementing the method of managing the functionality of the applications in the electronic device 100, according to exemplary embodiments as disclosed herein. As depicted in FIG. 22, the computing environment 2200 comprises at least one processor 2208 that is equipped with a controller 2204 and an Arithmetic Logic Unit (ALU) 2206, a memory 2210, a storage device 2212, networking devices 2216 and Input/Output (I/O) devices 2214. The processor 2208 is responsible for processing the instructions of the technique. The processor 2208 may execute operations based on commands received from the controller. Further, any logical and arithmetic operations involved in the execution of the instructions may be computed with the help of the ALU 2206.

The overall computing environment 2200 can be composed of multiple homogeneous and/or heterogeneous cores, multiple CPUs of different kinds, special media and other accelerators. The processor 2208 is responsible for processing the instructions of the technique. Further, the processor 2208 may be implemented as a single chip or over multiple chips.

The technique comprising of instructions and codes required for the implementation are stored in the memory unit 2210, the storage 2212 or both. At the time of execution, the instructions may be fetched from the corresponding memory 2210 or storage 2212, and executed by the processing unit 2208.

In case of any hardware implementations, various networking devices 2216 or external I/O devices 2214 may be connected to the computing environment to support the implementation through the networking unit and the I/O device unit.

The exemplary embodiments disclosed herein can be implemented through at least one software program running on at least one hardware device and performing network management functions to control the elements. The elements shown in the FIGS. 1 through 22 include blocks which can be at least one of a hardware device, or a combination of hardware device and software module.

The foregoing description of the specific exemplary embodiments will so fully reveal the general nature of the exemplary embodiments herein that others can, by applying current knowledge, readily modify or adapt for various applications such specific exemplary embodiments without departing from the generic concept, and, therefore, such adaptations and modifications should and are intended to be comprehended within the meaning and range of equivalents of the disclosed exemplary embodiments. It is to be understood that the phraseology or terminology employed herein is for the purpose of description and not of limitation. Therefore, while the exemplary embodiments herein have been described in terms of preferred embodiments, those skilled in the art will recognize that the exemplary embodiments herein can be practiced with modification within the spirit and scope of the embodiments as described herein.

What is claimed is:

1. An electronic device for managing functionality of applications, the electronic device comprising:
a memory; and
a processor, coupled to the memory, configured to:
detect a first input on a graphical element displayed on a display of the electronic device, wherein the graphical element represents a first application;
generate at least two sub-graphical elements based on the detected first input and based on functional data items of the first application, the detected first input comprising a splitting action performed by diverging a first touch point away from a second touch point while both the first touch point and the second touch point are simultaneous touch points of a user's fingers on the graphical element and each of the at least two sub-graphical elements representing a different functional data item among functional data items of the first application, wherein the functional data items are services, provided by the electronic device, having policies associated therewith;
control the display to display the at least two sub-graphical elements along with the respective functional data item of the first application;
detect an association event input with respect to a graphical element representing a second application and one of the sub-graphical elements associated with the first application;
dynamically create at least one policy based on the association event; and
apply the at least one policy to the second application, wherein one of the sub-graphical elements are overlaid onto at least a portion of a graphical element representing the second application by the association event input.

2. The electronic device of claim 1, wherein the processor is further configured to:
determine a total number of the functional data items of the first application;
wherein the at least two sub-graphical elements are equal or less in number compared to the total number of functional data items of the first application.

3. The electronic device of claim 1, wherein the processor is further configured to:
apply the at least one policy to a third application other than the first application and the second application.

4. The electronic device of claim 1, wherein the at least one policy comprises at least one of a dynamic policy, a derived policy, and a user created policy.

5. The electronic device of claim 1, wherein the processor is further configured to display the at least two sub-graphical elements in a functionality display region provided on at least a portion of the display of the electronic device.

6. The electronic device of claim 1, wherein the processor is further configured to:
detect when the at least one policy applied to the second application is met;
identify at least one functionality which is associated with the first application and configured for the second application based on the at least one policy; and
perform an action on the second application corresponding to the at least one functionality.

7. The electronic device of claim 6, wherein the action comprises at least one of:
removing the at least one functionality,
enabling the at least one functionality, and
disabling the at least one functionality.

8. The electronic device of claim 1, wherein the functional data item comprises at least one of:
a functionality associated with the first application,
a functionality associated with a dynamic policy,
a functionality associated with a derived policy,
a functionality associated with a user created policy, and
a recommendation of combining at least two of the functionalities associated with the first application, the dynamic policy, the derived policy, and the user created policy.

9. The electronic device of claim 1, wherein the display is configured to display the at least two sub-graphical elements based on a priority associated with the functional data item.

10. The electronic device of claim 1, wherein the processor is further configured to:
display a first sub-graphical element, among the at least two sub-graphical elements, at the first touch point, and
display a second sub-graphical element, among the at least two sub-graphical elements, at the second touch point.

11. The electronic device of claim 1, wherein a first visual representation of the first sub-graphical element and a second visual representation of the second sub-graphical element are identical to a third visual representation of the graphical element.

12. The electronic device of claim 11, wherein a second portion of the first visual representation of a first functional data item corresponding to the first sub-graphical element is different from a second portion of the second visual representation of a second functional data item corresponding to the second sub-graphical element.

13. The electronic device of claim 1,
wherein the graphical element comprises a plurality of graphical elements, each representing one of a plurality of first applications from among the plurality of first group of applications,
wherein the processor is further configured to:
dynamically create a plurality of policies, each corresponding to one of the plurality of graphical elements; and
apply two of more of the plurality of policies to one of a plurality of second applications from among the plurality of second group of applications, independent of a policy applied to the second application from among the plurality of second group of applications.

14. An electronic device for managing a functionality of applications, the electronic device comprising:
a memory; and
a processor, coupled to the memory, configured to:
detect a first input entered on a graphical element representing a first application displayed on a display of the electronic device; and
control the display to display at least one sub-graphical element representing a functional data item associated with a second application in response to the detected first input, the detected first input comprising a splitting action performed by diverging a first touch point away from a second touch point while both the first touch point and the second touch point are simultaneous touch points of a user's fingers on the graphical element on the graphical element representing the first application, wherein the at least one sub-graphical element is one of at least two sub-graphical elements generated by dividing a graphical element representing the second application based on functional data items of the second application, each of the at least two sub-graphical elements representing a different functional data item among functional data items of the second application, and wherein the functional data items are services, provided by the electronic device, having policies associated therewith, detect an association event input with respect to the first application and the functional data item associated with the second application, and perform an action on the first application based on the association event, wherein the action comprises dynamically creating and applying at least one policy to the first application based on the association event, wherein one of the sub-graphical elements are overlaid onto at least a portion of a graphical element representing the second application by the association event input.

15. The electronic device of claim 14, wherein the action comprises at least one of:
enabling at least one functionality associated with the second application, and
disabling the at least one functionality associated with the second application.

16. The electronic device of claim 14, wherein the processor is further configured to:
detect that at least one policy is met for the first application;
identify at least one functionality which is associated with the second application and configured for the first application based on the at least one policy; and
wherein the performing of the action comprises performing an action on the first application corresponding to the at least one functionality.

17. The electronic device of claim 16, wherein the action comprises at least one of:
inverting the at least one functionality,
enabling the at least one functionality, and
disabling the at least one functionality.

18. The electronic device of claim 14, wherein the functional data item comprises at least one of:
a functionality associated with the first application,
a functionality associated with a dynamic policy,
a functionality associated with a derived policy,
a functionality associated with a user created policy, and
a recommendation to combine at least two of the functionalities associated with the second application, the dynamic policy, the derived policy, and the user created policy.

19. The electronic device of claim 14, wherein the processor is configured to display the at least two sub-graphical elements on the display based on a priority associated with the functional data item.

20. A method of managing functionality of applications of an electronic device, the method comprising:
detecting, by a processor, a first input entered on a graphical element displayed on a display of the electronic device, the graphical element representing a first application;
generating, by the processor, at least two sub-graphical elements based on the detected first input and based on functional data items of the first application, the detected first input comprising a splitting action performed by diverging a first touch point away from a second touch point while both the first touch point and the second touch point are simultaneous touch points of a user's fingers on the graphical element and each of the at least two sub-graphical elements representing a different functional data item among functional data items of the first application, wherein the functional data items are services, provided by the electronic device, having policies associated therewith; and
controlling, the display to display the at least two sub-graphical elements along with the respective functional data item of the first application;
detecting an association event input with respect to a graphical element representing a second application and one of the sub-graphical elements associated with the first application;
dynamically creating at least one policy based on the association event; and
applying the at least one policy to the second application, wherein one of the sub-graphical elements are overlaid onto at least a portion of a graphical element representing the second application by the association event input.

21. The method of claim 20, further comprising:
applying, by the processor, the at least one policy to a third application other than the first application and the second application.

* * * * *